US008305525B2

(12) United States Patent
Yanai et al.

(10) Patent No.: US 8,305,525 B2
(45) Date of Patent: Nov. 6, 2012

(54) LIQUID CRYSTAL DISPLAY DEVICE, METHOD FOR MANUFACTURING THE SAME, AND IMAGE DISPLAY DEVICE

(75) Inventors: Yujiro Yanai, Kanagawa (JP); Hiroaki Sata, Kanagawa (JP); Hajime Nakayama, Kanagawa (JP); Yasuyuki Sasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/391,785

(22) PCT Filed: Feb. 18, 2011

(86) PCT No.: PCT/JP2011/053579
§ 371 (c)(1),
(2), (4) Date: Feb. 22, 2012

(87) PCT Pub. No.: WO2011/102493
PCT Pub. Date: Aug. 25, 2011

(65) Prior Publication Data
US 2012/0147304 A1 Jun. 14, 2012

(30) Foreign Application Priority Data

Feb. 18, 2010 (JP) .................................. 2010-034127
Sep. 15, 2010 (JP) .................................. 2010-207331

(51) Int. Cl.
*G02F 1/1335* (2006.01)
(52) U.S. Cl. .......................................... 349/96; 349/118
(58) Field of Classification Search ........................ None
See application file for complete search history.

(56) References Cited

FOREIGN PATENT DOCUMENTS

| JP | 9-265071 A | 10/1997 |
|---|---|---|
| JP | 10-023464 A | 1/1998 |
| JP | 10-232365 A | 9/1998 |
| JP | 2002-055342 A | 2/2002 |
| JP | 2002-328233 A | 11/2002 |
| JP | 2004-118185 A | 4/2004 |
| JP | 2005-215326 A | 8/2005 |
| JP | 2005-326818 A | 11/2005 |
| JP | 2008-170557 A | 7/2008 |
| JP | 2008-224763 A | 9/2008 |
| JP | 2008-304909 A | 12/2008 |
| WO | 2007/119560 A1 | 10/2007 |

OTHER PUBLICATIONS

Y. Yoshihara et al.; "3D Crosstalk of Stereoscopic (3D) Display using Patterned Retarder and Corresponding Glasses"; IDW '08; 2008; pp. 1135-1138.
Pierre Boher et al.; "Multispectral polarization analysis of circular polarizer stereoscopic 3D display"; IDW '09; 2009; pp. 1151-1154.
Chao-Te Lee et al.; P-10: "Design and Fabrication of Wide-view In-cell Microretarder & Polarizer for Stereoscopic LCD"; SID Symposium Digest; Mar. 2010; pp. 1260-1263; vol. 41, Issue 1.
Chao-Te Lee et al.; "Designs of broadband and wide-view patterned polarizers for stereoscopic 3D displays"; Optics Express; Dec. 8, 2010; pp. 27079-27094; vol. 18, No. 26.

*Primary Examiner* — Lucy Chien
(74) *Attorney, Agent, or Firm* — Jean C. Edwards, Esq.; Edwards Neils PLLC

(57) ABSTRACT

There is provided a liquid crystal display device that diminishes flickers caused by crosstalk of a three-dimensional image (an overlap of images) or reflection of external light. A liquid crystal display device includes a pair of substrates, at least one of the pair of substrates having an electrode and the pair of substrates being placed opposite each other, and a first polarizing plate placed on a light source side and a second polarizing plate placed on a view side with the liquid crystal layer sandwiched therebetween, in which a protective film on the view side of the second polarizing plate includes a transparent support satisfying $0 \leq |Re(550)| \leq 10$ and an optically anisotropic layer having a $\lambda/4$ function, and Rth of the protective film on the view side of the second polarizing plate is $|Rth| \leq 20$.

8 Claims, No Drawings

LIQUID CRYSTAL DISPLAY DEVICE, METHOD FOR MANUFACTURING THE SAME, AND IMAGE DISPLAY DEVICE

CROSS-REFERENCE TO RELATED APPLICATIONS

The present invention is a 35 U.S.C. 371 National Stage Entry of PCT/JP2011/053579, filed Feb. 18, 2011, which claims priority from Japanese Patent Application Nos. 2010-034127, filed on Feb. 18, 2010, and 2010-207331, filed on Sep. 15, 2010, the contents of all of which are herein incorporated by reference in their entirety.

TECHNICAL FIELD

The present invention relates to a liquid crystal display device that exhibits a wide view angle characteristic and a wide range of color reproducibility as well as superior 3D (a stereoscopic image and a three dimensional image) display performance, a method for manufacturing the same, and an image display device.

BACKGROUND ART 3D displays can be roughly classified into two types of a glasses type display (1) and an autostereoscopic display (2). In the glasses type display (1), a normal two dimensional display alternately displays an image for the right eye and an image for the left eye in an alternate-frame sequencing, and a left-eye image and a right-eye image are combined together by means of glasses equipped with a polarizing plate, to thus let the human brain artificially create a pseudo 3D (a stereoscopic image or a three dimensional image) display. In the meantime, in the autostereoscopic display (2), the two dimensional display simultaneously displays the image for the right eye and the image for the left eye, and an image is combined in a geometrically optical manner by use of an optical member, like a lens and a slit, to thus make the human aware of a 3D image.

The glasses type display (1) can be classified into (i) a polarizing glasses type display and (ii) a shutter glasses type display. In the polarizing glasses type display (i), an image for the right eye and an image for the left eye are alternately displayed on the two dimensional display on a per-line basis in the vertical direction, thereby alternately, solely displaying the right eye image and the left eye image in an alternate-frame sequencing. As a scheme for alternately displaying a right eye image and a left eye image on a per-line basis, a scheme for placing λ/4 retardation films on glass situated on a view-side polarizing plate of a liquid crystal display device in such a way that slow axes of the films cross each other at an angle of 90 degrees is proposed (see Patent Document 1). As a scheme for the shutter glasses type display (ii), a scheme is proposed for alternately displaying a right eye image and a left eye image on a two dimensional display in an alternate-frame sequencing and turning off a left eye of the glasses with a shutter when the right eye image is displayed, to thus shut off the left eye, so that only the right eye can recognize the image (see Patent Document 2).

RELATED ART DOCUMENTS

Patent Documents

Patent Document 1: JP-A-2005-215326
Patent Document 2: JP-A-10-23464

DISCLOSURE OF THE INVENTION

Problem that the Invention is to Solve

The autostereoscopic display (2) includes a lenticular type display (iii) and a parallax barrier type display (iv). The autostereoscopic display affords convenience of enabling the user to watch a 3D image without using glasses. However, a 3D image requires a position suitable for watching the three dimensional image. If the user sits away from the position, the user may not be able to watch the 3D image. Thus, a further improvement is required.

In the present invention, attention is paid to the glasses type display (1). In the glasses type display (1), a protective film interposed between the view-side polarizing plate in the liquid crystal display device and polarizing plates formed on the respective glasses develops an retardation. Therefore, there occurs crosstalk of a 3D image (a duplicate image) when the user watches the 3D image with his/her head inclined or watches the three dimensional image in an oblique direction, or flicker caused by reflection of external light.

An object of the present invention is to provide a liquid crystal display device reducing them and a method for manufacturing the liquid crystal display device.

Means for Solving the Problems

The above problems can be solved by the following constitutions.

(1) A liquid crystal display device comprising:
   a liquid crystal layer; and
   a first polarizing plate and a second polarizing plate that are placed with the liquid crystal layer sandwiched therebetween and that each include a polarizing film and a protective film provided on at least an outer surface of the polarizing film, in which the first polarizing plate is placed on a light source side and the second polarizing plate is placed on a view side,
   wherein
   the protective film on the view side of the second polarizing plate includes a transparent support satisfying the following Expression (1) and an optically anisotropic layer having a λ/4 function, and
   Rth of the protective film on the view side of the second polarizing plate is $|Rth| \leq 20$, $$0 \leq |Re(550)| \leq 10 \quad (I)$$

wherein Re(550) denotes an in-plane retardation value (unit: nm) at a wavelength of 550 nm; and Rth denotes a retardation value (unit: nm) in a film thickness direction at a wavelength of 550 nm, and wherein
the in-plane retardation value and the retardation value in the film thickness direction are defined by the following expressions with respect to an object:

$$Re = (nx - ny) \times d$$

$$Rth = ((nx + ny)/2 - nz) \times d$$

wherein nx denotes a refractive index in a direction of a slow axis in a plane of the object; ny denotes a refractive index in a direction orthogonal to nx in the plane; nz denotes a refractive index in a direction orthogonal to nx and ny; and "d" denotes a film thickness of the object in the direction of nz.

(2) The liquid crystal display device according to the above (1), wherein a total of Rth of the transparent support and Rth of the optically anisotropic layer in the protective film on the view side of the second polarizing plate is $|Rth| \leq 20$.

(3) A liquid crystal display device comprising:
  a liquid crystal layer; and
  a first polarizing plate and a second polarizing plate that are placed with the liquid crystal layer sandwiched therebetween and that each include a polarizing film and a protective film placed on at least an outer surface of the polarizing film, in which the first polarizing plate is placed on a light source side and the second polarizing plate is placed on a view side, wherein
    the protective film on the view side of the second polarizing plate includes a transparent support satisfying the following Expression (1) and an optically anisotropic layer having a λ/4 function, wherein
    a total of Rth of the transparent support and Rth of the optically anisotropic layer is |Rth|≦20, $$0 \leq |Re(550)| \leq 10 \quad (I)$$

wherein Re(550) denotes an in-plane retardation value (unit: nm) at a wavelength of 550 nm; and Rth denotes a retardation value (unit: nm) in a film thickness direction at a wavelength of 550 nm, and wherein
    the in-plane retardation value and the retardation value in the film thickness direction are defined by the following expressions with respect to an object:

$$Re=(nx-ny) \times d$$

$$Rth=((nx+ny)/2-nz) \times d$$

wherein nx denotes a refractive index in a direction of a slow axis in a plane of the object; ny denotes a refractive index in a direction orthogonal to nx in the plane; nz denotes a refractive index in a direction orthogonal to nx and ny; and "d" denotes a film thickness of the object in the direction of nz.
(4) The liquid crystal display device according to any one of the above (1) to (3), wherein the protective film on the view side of the second polarizing plate further includes one or more antireflection films on an outermost surface thereof
(5) The liquid crystal display device according to any one of the above (1) to (4), wherein a UV radiation absorbent is included in any of the transparent support constituting the protective film of the second polarizing plate, the optically anisotropic layer, an antireflection film, and an adhesive bonding them together.
(6) The liquid crystal display device according to any one of the above (1) to (5), wherein the transparent support constituting the protective film of the second polarizing plate includes a thermoplastic resin as a main component.
(7) A method for manufacturing a liquid crystal display device described in any one of the above (1) to (6), wherein the protective film of the second polarizing plate is produced by a co-flow-casting method.
(8) An image display device comprising a polarizing plate on a view side thereof,
  wherein
    the polarizing plate includes a polarizing film and a protective film on at least the view side of the polarizing plate,
    the protective film on the view side of the polarizing plate includes a transparent support satisfying the following Expression (1) and an optically anisotropic layer having a λ/4 function, and
    Rth of the protective film on the view side of the polarizing plate corresponds to |Rth|≦20, $$0 \leq |Re(550)| \leq 10 \quad (I)$$

wherein Re(550) denotes an in-plane retardation value (unit: nm) at a wavelength of 550 nm; and Rth denotes a retardation value (unit: nm) in a film thickness direction at a wavelength of 550 nm, and wherein
    the in-plane retardation value and the retardation value in the film thickness direction are defined by the following expressions with respect to an object:

$$Re=(nx-ny) \times d$$

$$Rth=((nx+ny)/2-nz) \times d$$

wherein nx denotes a refractive index in a direction of a slow axis in a plane of the object; ny denotes a refractive index in a direction orthogonal to nx in the plane; nz denotes a refractive index in a direction orthogonal to nx and ny; and "d" denotes a film thickness of the object in the direction of nz.

Advantage of the Invention

According to the present invention, it is possible to provide a liquid crystal display device that can diminish crosstalk that is a trouble of 3D image caused by a view angle characteristic and entrance of reflected external light. Further, according to the present invention makes, it is possible to provide a 3D display device, in particular a liquid crystal display device, that exhibits a high contrast ratio and an improved view angle characteristic. The liquid crystal display device of the present invention involves few transmission loss or stray light in the liquid crystal display and accomplishes a remarkably enhanced contrast ratio, during a black display.

MODE FOR CARRYING OUT THE INVENTION

An embodiment of a liquid crystal display device of the present invention and constituent members of the display device are described hereunder in sequence. Throughout the specification, a numerical range represented by use of a symbol "~" means a range that includes numerals preceding and following the symbol as an upper limit value and a lower limit value, respectively.

Throughout the specification, the terms "parallel" and "orthogonal" mean that they fall within a range of less than ±10 degrees with respect to each of their strict angles. It is preferable that a difference between the range and the strict angle should be under ±5 degrees. It is more preferable that the difference should be under ±2 degrees. Moreover, the term "substantially perpendicular" means that a perpendicular angle falls within a range of less than ±20 degrees with respect to the strict perpendicular angle. It is preferable that the range should have a difference of less than ±15 degrees with respect to the strict angle. It is more preferable that the range should have a difference of less than ±10 degrees. Moreover, the term "slow axis" means a direction in which a refractive index becomes maximum. A wavelength used for measuring a refractive index is λ=550 nm in a visible light area unless otherwise specified.

Throughout the specification, unless otherwise specified, the term "polarizing plate" is used so as to mean both an elongated polarizing plate and a polarizing plate cut into a size for incorporation into a liquid crystal display device (the term "cutting" employed in the specification is assumed to imply "punching" and "cutout"). Throughput the specification, the terms "polarizing film" and a "polarizing plate" are used while distinguished from each other. The term "polarizing plate" is assumed to mean a layered body having a transparent protective film on at least one side of the "polarizing film" for protecting the polarizing film.

<Layered Film>

A liquid crystal display device of the present invention is characterized as follows. That is, among elements of a first polarizing plate and a second polarizing plate that are placed on the respective sides of a liquid crystal, a protective film of the second polarizing plates placed on a view side (a view-side protective film) has a substantial zero value of retardation in the thickness direction (|Rth|≦20). As a result, occurrence of crosstalk and a fall in contrast ratio when the liquid crystal display device is watched in an oblique direction is prevented. Here, the liquid crystal cell includes at least a liquid crystal layer, and a typical embodiment of the liquid crystal cell includes: a pair of substrates that are disposed opposite to each other and at least one of which has an electrode; and a liquid crystal layer sandwiched between the pair of substrates. In particular, a remarkable effect is yielded in the case of a liquid crystal display device that makes the user watch an image through a third polarizing plate (glasses for 3D) that is placed on a view side of a second polarizing plate and that has a polarizing film and at least one protective film.

An optically anisotropic layer that exhibits a λ/4 function of producing circularly polarized light when light passes through the layer (a λ/4 layer) is formed or patterned over the entirety of the protective film of the second polarizing plate, and a right eye image and a left eye image are distinguished from each other by means of interaction with λ/4 layers formed on the respective glasses.

Even when the optically anisotropic layer (a retardation layer), like a λ/4 layer, is provided, a retardation hardly occurs in a thickness direction of the entire film constituting the view-side protective film. Hence, it is possible to prevent occurrence of crosstalk or a fall in contrast when the user watches the liquid crystal display device in an oblique direction through the glasses for 3D.

Moreover, even when a film having a retardation is used as a support of the λ/4 layer, by bringing to substantial zero a retardation in a thickness direction of the entirety of the films including another layered film, for instance, an antireflection film, it is possible to prevent occurrence of crosstalk or a fall in contrast when the user watches the liquid crystal display device in an oblique direction through the glasses for 3D.

The thicknesswise retardation (Rth) can be determined by means of Expressions (1) and (2) that will be provided later.

Bringing the thicknesswise retardation to substantial zero means that the retardations become substantially equal when the liquid crystal display device is watched from any deflection angles (polar angles). Accordingly, when certain polarized light passes through the view-side protective film, an amount of change in polarization of the light becomes substantially constant regardless of angles (polar angles) at which the light passes; hence, a substantially identical polarized state is attained. For this reason, a difference between observation of the polarizing plate from the front and observation of the polarizing plate in an oblique direction can be diminished.

The above description is directed toward the case of a single film layer. However, even in the case of a layered film, a similar advantage is yielded by bringing a retardation in a thickness direction of the entirety of the layered film to substantial zero. As a matter of course, the amount of change involves a slight difference in strict sense from the viewpoint of an asymmetrical characteristic, but the above descriptions will not be demolished so long as the film is designed in consideration of the difference.

It is also preferable that a total of Rth of the transparent support and Rth of the optically anisotropic layer fulfill |Rth|≦20 in the liquid crystal display device of the present invention.

When another surface film, like an antireflection film, is not provided on the protective film or when Rth is substantially equal to zero despite another surface film being placed on the protective film, a total of Rth of the transparent support and Rth of the optically anisotropic layer is brought to |Rth|≦20, whereby occurrence of crosstalk and a fall in contrast can be prevented. Consequently, a liquid crystal display device in which a total of Rth of the transparent support and Rth of the optically anisotropic layer is |Rth|≦20 is one preferred embodiment of the liquid crystal display device of the present invention.

<Polarizing Plate>

Each of the first polarizing plate and the second polarizing plate of the present invention includes a polarizing film and a protective film. The protective film is provided on at least an outer surface of the polarizing film (a surface on the other side of the polarizing film opposing a liquid crystal cell when placed in a liquid crystal display device). However, it is preferable that a protective film be provided on either side of the polarizing film.

A known polarizing film can be used as the polarizing film of the polarizing plate without specific limitations. There are, for instance, an iodine-based polarizing film, a dye-based polarizing film using a dichronic dye, and a polyene-based polarizing film. The iodine-based polarizing film and the dye-based polarizing film are generally manufactured by use of a polyvinyl alcohol film. In relation to a thickness of the polarizing film, a thickness adopted for an ordinary polarizing plate can be adopted without any specific limitations.

A transparent support of a view-side protective film of the second polarizing plate, which will be described below, can be commonly used as a protective film of the polarizing plate.

The view-side protective film of the second polarizing plate has an optically anisotropic layer that exhibits a λ/4 function and that is laid on a transparent support. The view-side protective film of the second polarizing plate is hereunder described in detail.

<Transparent Support>

In a case where the aforementioned second polarizing plate is layered so as to have, in sequence from a liquid crystal cell, at least a polarizer, a transparent support, and a λ/4 layer; when the support has Re; and when an angle which an absorption axis or a transmission axis of a polarizer forms with a slow axis or a fast axis of the support is zero degree or any angle other than 90 degrees; namely, when there is an axial deviation, linearly polarized light that has passed through and exited from the polarizer turns into elliptically polarized light after having passed through the support. Since the light passes while staying in that polarized light, through the λ/4 layer, the light does not come into exactly the same polarized state as that designed. Therefore, this will be a cause of an increase in crosstalk or a decrease in brightness.

In a case where the aforementioned second polarizing plate is layered so as to have, in sequence from a liquid crystal cell, at least a polarizer, a λ/4 layer, and a support; when the support has Re, the circularly polarized light passed through the λ/4 layer will turn into elliptically polarized light even when axial deviation does not exist, and crosstalk will cause lower brightness.

Accordingly, in the present invention, an absolute value of front retardation Re (550) at a wavelength of 550 nm in the transparent support is 10 nm or less. That is, by satisfying Expression (1) (0≦|Re (550)|≦10), an increase in crosstalk or a decrease in brightness is prevented. The absolute value of Re (550) is preferably 7 nm or less and, more preferably, 5 nm or less.

Moreover, in relation to a relationship with an optically anisotropic layer (a λ/4 layer) exhibiting a λ/4 function to be described later, it is desirable for the transparent support to satisfy −150≦Rth (550)≦100 and, more preferably, −150≦Rth (550)≦50, in order that a total of Rth of the transparent support and Rth of the λ/4 layer fulfills |Rth|≦20 or that a total of Rth of the transparent support, Rth of the λ/4 layer, and Rth of another layer satisfies |Rth|≦20 when there is an additional layer.

Here, Re(λ) designates an in-plane retardation value (a unit: nm) at a wavelength λ nm; and Rth(λ) designates a retardation value (a unit: nm) in a film thickness direction of at a wavelength λ nm <Materials of the Transparent Support>

A preferred material that forms the transparent support of the present invention includes polymer that exhibits superior characteristics, such as optical performance, transparency, mechanical strength, thermal stability, a superior water shielding characteristic, isotropy, and the like. However, any material can be used, so long as Re and Rth fall within a range where Expression (1) is fulfilled. Example materials include polycarbonated polymers; polyester polymers like polyethylene terephthalate and polyethylene naphthalate; acrylic polymers like polymethyl methacrylate; styrene polymers like polystyrene, acrylonitrile styrene copolymer (AS resin), and the like. Other example materials include polyolefins like polyethylene and polypropylene; polyolefin polymers like ethylene propylene copolymer; vinyl chloride polymers; amide polymers, like nylons and aromatic polyamides; imide polymers; sulfone polymers; polyether sulfone polymers; polyether ether ketone polymers; polyphenylene sulfide polymers; vinylidene chloride polymers; vinyl alcohol polymers; vinyl butyral polymers; arylated polymers; polyoxymethylene polymers; epoxy polymers; and polymers mixed with any of the above-mentioned polymers. Polymer films of the present invention can also be formed as a hardened layer made of UV curable resins, such as acrylic resins, urethane resins, acrylic urethane resins, epoxy resins, and silicone resins, or a hardened layer made of thermosetting resins.

Preferred materials used for making the transparent support of the present invention also include thermoplastic resins. Acrylic resins and thermoplastic norbornene resins can preferably be used as thermoplastic resins. ZEONEX (Registered Trademark) resins and ZEONOR (Registered Trademark) resins manufactured by Zeon Corporation, ARTON (Registered Trademark) resins manufactured by JSR Corporation, and others can be mentioned as thermoplastic norbornene resins.

Cellulose, polymers (hereinafter called "cellulose acylates") that have hitherto been used as a transparent protective film for a polarizing plate and that are typified by triacetyl cellulose can be preferably used as a material for making up the transparent support of the present invention. Detailed explanations will be given primarily to cellulose acylates as an example transparent support of the present invention. It is evident that technical matters of the cellulose acylates can be similarly applied to other polymer films.

<Cellulose Acylate Raw Cotton>

Cotton linters, wood pulp (hardwood pulp and softwood pulp), and others have been available as celluloses for a cellulose acylate material employed in the present invention. Cellulose acylates produced from any raw celluloses can also be used. In some cases, the cellulose acylates can be used in the form of a mixture. Details of the raw celluloses are described in; for instance, Plastic Material Course (17) Cellulose Resins (written by Marusawa and Uda, published by Nikkan Kogyo Shimbun, Ltd., issued in 1970) and Technical Report 2001-1745 (on pp. 7 to 8) published by the Japan Institute of Invention and Innovation. However, the present invention is not restricted to the descriptions.

<Degree of Substitution of Cellulose Acylate>

Cellulose acylates of the present invention manufactured from a raw material; namely, aforementioned celluloses, are now described. Cellulose acylates of the present invention are produced by acylating a hydroxyl radical of cellulose. In relation to a substituent radical for the cellulose acylates, it is possible to use any of acetyl radicals; that is, acyl radicals having from 2 to 22 carbon atoms. In relation to the cellulose acylates of the present invention, there are not any specific restrictions on a degree of substitution of hydroxyl radicals of cellulose. However, a degree of binding of an acetic acid used as a substitute for the hydroxyl radical of cellulose and/or a degree of binding of fatty acids having from 3 to 22 carbon atoms is measured, so that the degree of substitution can be calculated. A measurement can be conducted in conformance with ASTM D-817-91 with regard to a measurement method.

As mentioned above, in relation to the cellulose acylates of the present invention, there are not any restrictions on the degree of substitution of the hydroxyl radical of cellulose. However, a preferred degree of substitution of acyl for the hydroxyl radical of cellulose ranges from 2.50 to 3.00. A more preferred degree of substitution ranges from 2.75 to 3.00, and a further more preferred degree of substitution ranges from 2.85 to 3.00.

Of acetic acids and/or fatty acids having from 3 to 22 carbon atoms that are substitutes for the hydroxyl radical of cellulose, acyl radicals having from 2 to 22 carbon atoms can be either aliphatic radicals or aromatic radicals and are not limited to any specific radicals. Alternatively, the acetic acid or the fatty acid may be any one of the radicals mentioned above or a mixture of two or more types of radicals. Cellulose esters acylated by any of the radicals include; for instance, alkyl carbonyl ester of cellulose, alkenyl carbonyl ester or aromatic carbonyl ester, aromatic alkyl carbonyl ester, and the like. Each of them can additionally include a substituted radical. Preferred acyl radicals include acetyl, propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexane carbonyl, oleoyl, benzoyl, naphthyl carbonyl, cinnamoyl radicals, and the like. Of these materials, preferred materials include acetyl, propionyl, butanoyl, dodecanoyl, octadecanoyl, t-butanoyl, oleoyl, benzoyl, naphthyl carbonyl, cinnamoyl, and others. Further, acetyl, propionyl, and butanoyl are further more preferable.

Assiduous studies conducted by the present inventors show that, in a case where the acyl substituent substituted for the hydroxyl radical of cellulose substantially includes at least two types of radicals, among acetyl radicals, propionyl radicals, and butanoyl radicals, optical anisotropy of a cellulose acylate film can be decreased when a degree of substitution of acyl ranges from 2.50 to 3.00. A more preferred degree of substitution of acyl ranges from 2.60 to 3.00, and further preferred degree of substitution of acyl ranges from 2.65 to 3.00. When the acyl substituent substituted for the hydroxyl group of cellulose is made of only the acetyl radical, the optical anisotropy of the film can be reduced. In addition, from the viewpoint of compatibility with an additive and solubility in an organic solvent used, a preferred degree of substitution of acyl ranges from 2.80 to 2.99, and a more preferred degree of substitution of acyl ranges from 2.85 to 2.95.

<Degree of Polymerization of Cellulose Acylate>

A degree of polymerization of cellulose acylate preferably used in the present invention ranges from 180 to 700 in terms of a viscometric average degree of polymerization. A degree of polymerization of cellulose acetate preferably ranges from 180 to 550; more preferably ranges from 180 to 400; and particularly preferably ranges from 180 to 350. When the degree of polymerization is too high, the viscosity of a doped solution of cellulose acylate becomes high, whereby manufacturing a film becomes difficult as a result of casting of the solution. On the contrary, when the degree of polymerization is too low, the strength of a manufactured film decreases. An average degree of polymerization can be measured by means of a limiting viscosity technique proposed by Uda et al. (Kazuo UDA and Hideo SAITO, Fiber Science and Technology, vol. 18, No. 1, pp. 105 to 120, 1962). Details of the technique are provided in JP-A-9-95538.

A molecular weight distribution of cellulose acylate preferably used in the present invention is evaluated by means of gel permeation chromatography. Cellulose acylate preferably assumes a small polydispersity index Mw/Mn (Mw designates a mass average molecular weight, and Mn designates a number average molecular weight) and a narrow molecular weight distribution. Specifically, a value of Mw/Mn preferably ranges from 1.0 to 3.0; more preferably from 1.0 to 2.0; and most preferably from 1.0 to 1.6.

When low molecular components are removed from the cellulose acylate, the cellulose acylate including smaller amounts of low molecular components becomes higher than ordinary cellulose acylate in terms of an average molecular weight (a degree of polymerization) but lighter than the same in terms of a viscosity. For this reason, the cellulose acylate having smaller amounts of low molecular components is useful. The cellulose acylate including smaller amounts of low molecular components can be produced by eliminating low molecular components from cellulose acylate synthesized by an ordinary technique. Removal of low molecular components can be carried out by cleansing cellulose acylate with an appropriate organic solvent. When cellulose acylate including smaller amounts of low molecular components is manufactured, it is desirable to control an amount of sulfuric acid catalyst used in an acetification reaction such that 0.5 to 25 parts by weight of sulfuric acid catalyst is achieved with respect to 100 parts by weight of cellulose. So long as the amount of sulfuric acid catalyst is controlled so as to fall within the range, cellulose acylate that is preferable even in terms of a molecular weight distribution (that has a uniform molecular weight distribution) can be synthesized. When the sulfuric acid catalyst is used in manufacturing cellulose acylate of the present invention, a moisture content of sulfuric acid catalyst is preferably 2 mass % or less; more preferably 1 mass % or less; and particularly preferably 0.7 mass % or less. In general, cellulose acylate contains water and has hitherto been known to assume a moisture content of 2.5 to 5 mass %. In order to achieve this moisture content for the cellulose acylate of the present invention, the cellulose acylate must be dried. So long as an intended moisture content is achieved, a drying technique is not particularly limited. A technique for synthesizing cellulose acylate of the present invention is described in detail on pp. 7 to 12 of the technical report published by the Japan Institute of Invention and Innovation (Published technical report 2001-1745, issued on Mar. 15, 2001, the Japan Institute of Invention and Innovation).

If the cellulose acylate of the present invention falls within the above-mentioned ranges in terms of a substitution, a degree of substitution, the degree of polymerization, and a molecular weight distribution, a single type of cellulose acylate or two or more different types of cellulose acylates can be used in combination.

<Additives for the Cellulose Acylate>

Various additives (e.g., a chemical compound for decreasing optical anisotropy, a wavelength dispersion regulator, fine particles, a plasticizer, a UV inhibitor, an antidegradant, a parting agent, an optical property regulator, and others) can be added to the cellulose acylate of the present invention. A variety of known types of additives can be used for the cellulose acylate as in the case of a common optical film. Timing of addition of the additive can be any time point in a dope preparation process (i.e., a process for preparing a cellulose acylate solution). However, processing pertaining to a process of adding an additive to prepare a dope can also be performed at the end of the dope preparation process.

It is desirable to let the cellulose acylate film of the present invention contain at least one type of compound that decreases optical anisotropy; especially, a retardation Rth achieved in a thickness direction of the film.

<Structural Characteristic of a Compound that Decreases the Optical Anisotropy of the Cellulose Acylate Film>

Compounds that decrease the optical anisotropy of the cellulose acylate film are now described. Assiduous studies conducted by the present inventors find that optical anisotropy is sufficiently decreased by use of a compound which inhibits cellulose acylate in the film from being oriented in an in-plane direction, to thus make the in-plane retardation Re close to zero. To this end, it is advantageous for a compound that decreases optical anisotropy to be sufficiently compatible with cellulose acylate and not to have a rod-shaped structure or a planar structure. Specifically, when a compound has plural planar functional groups, like aromatic radicals, a structure that includes functional groups not within a single plane but within a nonplanar plane is advantages for the compound.

(Log P value)

Among compounds that decrease optical anisotropy by inhibiting orientation of cellulose acylate along an in-plane direction and a thickness direction of a film in the same manner as mentioned above, compounds that assume an octanol-moisture coefficient (a log P value) falling within a range from 0 to 7 are preferable for manufacture of the cellulose acylate film of the present invention. A compound whose log P value exceeds a value of 7 is less compatible with cellulose acylate and susceptible to white turbidity of a film and chalking. Further, a compound whose log P value is smaller than a value of 0 exhibits a high hydrophilic property and may deteriorate water resistance of a cellulose acetate film. A more preferable range of a log P value is from 1 to 6, and a particularly preferable range of the log P value is from 1.5 to 5.

The octanol-water distribution coefficient (log P value) can be measured by means of the shake flask technique described in JIS (Japanese Industrial Standards) Z7260-107 (2000). The octanol-water distribution coefficient (log P value) can also be estimated by means of a computational chemical technique or an empirical technique in lieu of actual measurement. Preferably used computational techniques include a Crippen's fragmentation technique (J. Chem. Inf. Comput. Sci., 27. 21 (1987).), a Viswanadhan's fragmentation technique (J. Chem. Inf. Comput. Sci., 29. 163 (1989).), a Broto's fragmentation technique (Eur. J. Med. Chem.—Chim. Theor., 19, 71 (1984).), and the like. Among them is preferable the Crippen's fragmentation technique (J. Chem. Inf. Comput. Sci., 27. 21 (1987).). When the log P value of a certain compound varies according to a measurement technique or a computational technique, it is preferable to make a determination as to whether or not the compound falls within the scope of the present invention, according to the Crippen's fragmentation technique. Log P values described in the specification of the present patent application are determined by means of the Crippen's fragmentation technique (J. Chem. Inf. Comput. Sci., 27. 21 (1987).).

<Physical Properties of Compounds that Decrease Optical Anisotropy>

Compounds that decrease optical anisotropy may or may not contain aromatic radicals. A molecular weight of a compound that decreases optical anisotropy preferably ranges from 150 to 3000, more preferably from 170 to 2000, and particularly preferably from 200 to 1000. So long as the compound falls within these molecular weight ranges, the compound can assume a specific monomeric structure, an oligomeric structure including plural bonded monomer units, a polymeric structure, or the like.

A compound that decreases optical anisotropy preferably is a solid that assumes a liquid form at 25 degrees centigrade and a melting point ranging from 25 to 250 degrees centigrade and, more preferably, a solid that assumes a liquid form at 25 degrees centigrade and a melting point ranging from 25 to 200 degrees centigrade. It is desirable that the compound that decreases optical anisotropy will not vaporize in a dope casting process and a dope drying process during manufacture of a cellulose acylate film.

An amount of compound to be added to decrease optical anisotropy preferably ranges from 0.01 to 30 mass %, more preferably from 1 to 25 mass %, and particularly preferably from 5 to 20 mass %, with respect to cellulose acylate.

The compound that decreases optical anisotropy can be used solely, or two types of compounds or more can also be used while mixed at an arbitrary ratio.

Timing when the compound that decreases optical anisotropy is to be added may be anytime or last in the course of manufacture of a dope.

In relation to the compound that decreases optical anisotropy, an average content rate of the compound achieved at a level that is about 10% of the total depth of the cellulose acylate film from at least a surface on one side of the film is 80 to 99% of an average content rate of the compound achieved at a center of the total depth of the film. An abundance of compound can be determined by measuring the amount of compound existing in a surface and center of the cellulose acylate film through the use of an infrared absorption spectrum described in JP-A-8-57879.

Specific examples of the compound that are preferably used in the present invention and that decrease optical anisotropy of the cellulose acylate film include; for instance, compounds described in paragraphs (0035) to (0058) in JP-A-2006-199855, and the present invention is not limited to the compounds.

<Additive to the Transparent Support>

(UV Absorbent)

The protective film of the second polarizing plate, which is the characteristic of the present invention, lies on a view side. Accordingly, the protective film is susceptible to an influence of external light; in particular, UV radiation. For this reason, it is preferable for any of members making up the proactive film to contain a UV absorbent (a ultraviolet radiation absorbing agent). Preferably, any of the transparent support, the optically anisotropic layer, and the antireflection film that make up the protective film or an adhesive bonding them together contains a UV absorbent.

Of all others, a compound that exhibits an absorbing effect at a UV range of 200 to 400 nm and that decreases retardation values |Re(400) to Re(700)| and |Rth(400) to Rth(700)| of the film is preferable as the UV absorbent. It is better to use 0.01 to 30 mass % of the compound with respect to a cellulose acylate solid content.

Recently, in order to enhance brightness at smaller power on a liquid crystal display device, like a TV set, a notebook personal computer, and a mobile portable terminal, an optical member used in a liquid crystal display device has been required to exhibit a superior transmission factor. In this regard, when the cellulose acylate film is additionally provided with a compound that exhibits an absorbing effect at a UV range of 200 to 400 nm and that decreases retardation values |Re(400) to Re(700)| and |Rth(400) to Rth(700)| of the film, the compound is required to exhibit a superior spectrum transmission factor. In the cellulose acylate film of the present invention, a spectrum transmission factor achieved at a wavelength of 380 nm preferably ranges from 45% to 95%, and a spectrum transmission factor achieved at a wavelength of 350 nm is preferably 10% or less.

The UV absorbent preferably used in the present invention, such as that mentioned above, preferably has a molecular weight of 250 to 1000 from the viewpoint of volatility. The molecular weight ranges more preferably from 260 to 800; much more preferably from 270 to 800; and particularly preferably from 300 to 800. If the molecular weight falls within any of these ranges, the absorbent can assume any specific monomeric structure, an oligomeric structure including plural bonded monomer units, or a polymeric structure.

The UV absorbent preferably will not vaporize in the course of the dope casting process and the dope drying process during manufacture of a cellulose acylate film.

For instance, compounds described in sections (0059) to (0135) in JP-A-2006-199855 are mentioned as specific examples of the UV absorbent of the cellulose acylate film preferably used in the present invention.

A thickness of the transparent support preferably ranges from 20 to 200 μm and, more preferably, from 40 to 100 μm.

<An Optically Anisotropic Layer>

An optically anisotropic layer of the present invention is a λ/4 layer having a λ/4 function; namely, a function of converting linearly polarized light into circularly polarized light. There are various methods for forming an optically anisotropic layer having a λ/4 function. In particular, according to the present invention, a liquid crystal compound is polymerized and immobilized while remaining oriented, thereby forming an optically anisotropic layer.

Various liquid crystalline compounds can be used in combination in order to optimize optical performance, production qualification, or the like.

Rod-shaped liquid crystalline compounds or discotic liquid crystalline compounds can be used as the liquid crystalline compounds.

In general, a liquid crystalline polymeric compound is higher than a liquid crystal low molecular compound having mesogen of the same type in terms of Δn. Hence, required retardation can be accomplished by means of a small thickness. Moreover, since the liquid crystal polymeric compound exhibits high viscosity, cissing which will arise during coating operation and cause orientational defects is less likely to arise. Hence, the liquid crystal polymeric compound is preferable.

Compounds having the polymeric radicals, such as those mentioned above, are preferable as a rod shaped liquid crystalline compound that can be used for an optically anisotropic layer of the present invention. For instance, any one selected from compounds described in publications and specifications provided below can be used; for instance, Makromol. Chem., vol. 190, pg. 2255 (1989); Advanced Materials vol. 5, pg. 107 (1993); U.S. Pat. No. 4,683,327; U.S. Pat. No. 5,622,648; U.S. Pat. No. 5,770,107; International Publication (WO) 95/22586; International Publication (WO) 95/24455; International Publication (WO) 97/00600; International Publication (WO) 98/23580; International Publication (WO) 98/52905; JP-A-1-272551; JP-A-6-16616; JP-A-7-110469; JP-A-11-80081; JP-A-11-513019; Japanese Patent Application No. 2001-64627; and others.

A compound represented by General Formula (II) is preferable as the low molecular rod-shaped liquid crystalline compound.

Q1-L1-Cy1-L2-(Cy2-L3)$n$-Cy3-L4-Q2    General Formula (II)

In the formula, reference symbols Q1 and Q2 independently denote respective polymerizable groups; L1 and L4 independently denote a bivalent linking group, respectively; L2 and L3 independently denote a single bond or a bivalent linking group, respectively; Cy1, Cy2, and Cy3 independently denote respective bivalent ring groups; and "n" denotes 0, 1, or 2.

In the Formula, reference symbols Q1 and Q2 independently denote respective polymerizable groups. It is preferable that polymerization reaction of the polymerizable groups be addition polymerization (including ring opening polymerization) or condensation polymerization. Put another way, it is preferable that polymerizable groups be functional groups capable of performing addition polymerization or condensation polymerization.

Compounds described in paragraphs (0035) to (0050) in JP-A-2004-240012 are mentioned as specific examples of a compound represented by General Formula (II).

Compounds described in various literatures (C. Destrade et al., Mol, Crysr. Liq. Cryst., vol. 71, page 111 (1981): "Chemistry of Liquid Crystal" edited by the Chemical Society of Japan, quarterly issue of chemical review paper, No. 22, Chapter 5, Second section of Chapter 10 (1994); B. Kohne et al., Angew. Chem. Soc. Chem. Comm., page 1794 (1985); and J. Zhang et al., J. Am. Chem. Soc., vol. 116, page 2655 (1944)), can be employed as a discotic liquid crystalline compound used for the optically anisotropic layer of the present invention. Polymerization of the discotic liquid crystalline compound is described in connection with JP-A-8-27284.

It is preferable for a discotic liquid crystalline compound to have polymerizable radicals so that the compound can be immobilized by means of polymerization. For instance, a conceivable structure is that polymerizable radicals are bonded as substituent radicals to a disc-shaped core of a discotic liquid crystalline compound. However, when the polymerizable radicals are directly coupled to the disc-shaped core, it becomes difficult to hold an oriented state during polymerization reaction. Accordingly, a preferred structure is to have a linking radical between the disc-shaped core and the polymerizable radical. Specifically, it is preferable that the discotic liquid crystalline compound having the polymerizable radicals should be a compound represented by the following formula.

D(-L-P)$n$

In the formula, reference symbol D denotes a disc-like core; L denotes a bivalent linking radical; P denotes a polymerizable radical; and "n" denotes integers 1 through 12. Preferred specific examples of the disc-shaped core (D), the bivalent linking radical (L), and the polymerizable radical (P) correspond respectively to (D1) to (D15); (L1) to (L25); and (P1) through (P18) described in JP-A-2001-4837. Descriptions provided in the patent document can preferably be used. A discotic nematic liquid crystal phase—solid phase transition temperature of a liquid crystalline compound preferably ranges from 30 to 300 degrees centigrade and, more preferably, from 30 to 170 degrees centigrade.

The optically anisotropic layer of the present invention can be applied to both a type of polarizing plate whose entire surface is coated with a λ/4 layer and a patterned retardation layer in which plural right-eye retardation areas and plural left-eye retardation areas are alternately formed; for instance, on a per-line basis, and patterned so as to create the right-eye retardation areas and the left-eye retardation areas.

The type of the polarizing plate whose entire surface is coated with the λ/4 layer is applied to a shutter glasses system. In the mean time, a system in which a λ/4 layer is patterned on a view-side polarizing film in order to display a right-eye image and a lefty-eye image by turns on a per-line basis can be applied to a polarizing glasses system.

In the case of a 3D display using polarizing glasses, an index called crosstalk is used as an important characteristic that exerts a decisive influence on image quality. The index shows a ratio of a quantity of left-eye image light that is not wanted to enter the right eye to a quantity of right-eye image light (information light) to enter the right eye by way of glasses. An ideal index is 0%.

According to the present invention, when the optically anisotropic layer is put on a video display device, like a liquid crystal display, and appropriately combined with polarizing glasses, to thus produce a 3D display, crosstalk attributable to a displacement of absolute value of a retardation or wavelength dispersion of retardation can be curtailed.

A thickness of the optically anisotropic layer preferably ranges from 0.5 to 6 μm and more preferably from 1 to 4

<Process for Manufacturing a Cellulose Acylate Film>
<Solving Process>

In relation to preparation of a cellulose acylate solution (a dope) of the present invention, a method for solving the cellulose acylate is not limited to any particular method and can be implemented at room temperature. Moreover, the solving method can be practiced by means of a cool solution process, a hot solution process, or a combination of both. A manufacturing process described in detail on pp. 22 to 25 in a technical report published by the Japan Institute of Invention and Innovation (Published technical report No. 2001-1745, issued on Mar. 15, 2001, the Japan Institute of Invention and Innovation) is preferably used in connection with a process for preparing a cellulose acylate solution of the present invention and also with condensation of a solution incident to a solution process and a filtration process.

(Degree of Clearness of the Doped Solution)

A value of 85% or more is preferable as a degree of transparency of a dope of the cellulose acylate solution of the present invention. The degree of transparency is more preferably 88% or more and further preferably 90% or more. In the present invention, various additives are ascertained to have been sufficiently dissolved in the cellulose acylate doped solution. In relation to a specific method for calculating the degree of clearness of a dope, a doped solution is poured into a glass cell measuring 1 cm per side. Absorbance appearing at a wavelength of 550 nm is measured by means of a spectrophotometer (UV-3150, manufactured by Shimadzu). Only the solution is measured as a blank in advance, and the degree of clearance of the cellulose acylate solution is calculated from an absorbency ratio of the blank to the cellulose acylate solution.

<Casting, Drying, and Take-Up Processes>

A method for manufacturing a film using the cellulose acylate solution of the present invention is now described. A solution casting film-forming method and a solution casting film-forming apparatus that are used for manufacturing a related art cellulose acetate film are used for the method and facility for manufacturing a cellulose acylate film of the present invention. A dope (a cellulose acylate solution) prepared in a dissolver (kiln) is temporarily preserved in a storage kiln, whereby bubbles contained in the dope are defoamed, to thus be finally prepared. By way of a pressure metering gear pump capable of feeding a given quantity of solution with high accuracy by means of for instance, the number of revolutions, a dope is sent to a pressure die from a dope outlet. The dope is then uniformly cast from a pipe sleeve (slit) of a pressure die over a metal support of a casting block that runs endlessly. A half-dry dope film (hereinafter also called a "web") is exfoliated from the metal support at a point of exfoliation where the metal support substantially makes a round. Both ends of the thus-acquired web are pinched with clips. The web is conveyed and dried by means of a tenter while the width of the web is maintained. Subsequently, the thus-obtained film is mechanically conveyed by means of a group of rolls of a drying device. After completion of drying of the film, the film is taken up to a predetermined length as a roll by means of a take-up bar. A combination of the tenter with the drying device of the group of rolls changes according to an objective. Under the solution casting film-forming method used for forming a functional protective film that is an optical member for use with an electronic display that is the major use of the cellulose acylate film of the present invention, in addition to the solution casting film-forming device, a coating device for processing a surface of the film, such as an undercoating layer, an antistatic layer, an antihalation layer, a protective layer, and the like, is frequently disposed. Detailed descriptions about this are provided on pp. 25 to 30 of a technical report published by the Japan Institute of Invention and Innovation (Published technical report No. 2001-1745, issued on Mar. 15, 2001, the Japan Institute of Invention and Innovation). The coating device is categorized into casting (including co-flow-casting), the metal support, drying, exfoliation, and others, and can preferably be used in the present invention.

The thickness of the cellulose acylate film preferably ranges from 10 to 120 μm; more preferably from 20 to 100 μm; and further preferably from 30 to 90 μm.

<Antireflection Film>
(Antireflection Layer)

The outermost surface of the view-side protective film placed on the other side with respect to the side of the second polarizing plate facing the liquid crystal cell is preferably provided with one or more antireflection films. In addition to including the antireflection layer, the antireflection film can be provided with another functional film. In particular, in the present invention, there is preferably employed an antireflection film in which at least a light scattering layer and a low refractive layer are stacked in this sequence, or an antireflection film having an antireflection layer in which a medium refractive layer, a highly refractive layer, and a low refractive layer are stacked in this sequence. The reason for this is that occurrence of flicker caused by reflection of external light particularly when a 3D image is displayed, can effectively be prevented.

In relation to the antireflection film, a film made by laying an antireflection layer on a transparent support can be provided on a view-side protective film of the second polarizing plate. Alternatively, the view-side protective film of the second polarizing plate can also double as a support of the antireflection film. In the latter case, the essential requirement is to provide the view-side protective film of the second polarizing plate directly with a functional layer, such as an antireflection layer.

Preferable example antireflection films are provided below.

There is now described a preferred example antireflection layer formed by laying a light scattering layer and a low refractive layer on the view-side protective film of the second polarizing plate.

Mat particles are spread over the light scattering layer of the present invention. A refractive index of a material of the light scattering layer except an area over which the mat particles are spread preferably ranges from 1.50 to 2.00. A refractive index of the low refractive layer preferably ranges from 1.35 to 1.49. In the present invention, the light scattering layer possesses both an antidazzling characteristic and a hardcoating characteristic. The light scattering layer can be formed from a single layer or plural layers; for instance, two to four layers.

An irregular surface shape of the antireflection layer is designed such that center line average roughness Ra ranges from 0.08 μm to 0.40 μm; that ten-point average roughness Rz is 10 times or less as large as Ra; that average peak-valley distance Sm ranges from 1 μm to 100 μm; that standard deviation of peak height from the greatest depth of the valleys is 0.5 μm or less; that standard deviation of the average peak-valley distance Sm achieved with reference to the center line is 20 μm or less; and that a plane having an inclination of 0 to 5 degrees accounts for 10% or more. As a result, a sufficient antidazzling characteristic and a visual uniform mat feeling are preferably accomplished.

A color hue of reflected light under a light source C preferably becomes neutral when a ratio of the minimum reflectance to the maximum reflectance achieved under conditions of an a*value ranging from −2 to 2, a b*value ranging from −3 to 3, and a wavelength ranging from 380 nm to 780 nm, comes to 0.5 to 0.99. Further, the b*value of transmitted light achieved under the C light source is set so as to range from 0 to 3, a yellowish hue of a white display appearing when the antireflection layer is applied to the display device is preferably lessened.

Moreover, a lattice measuring 120 μm×40 μm is inserted between a surface light source and the antireflection film of the present invention, and a distribution of brightness on the film is measured. Provided that a standard deviation of brightness distribution achieved through measurement is 20 or less, glaring which may arise when the film of the present invention is applied to a high definition panel is preferably lessened.

The optical characteristic of the antireflection layer of the present invention is set such that mirror reflectivity assumes a value of 2.5% or less; that transmissivity assumes a value of 90% or more; and that 60-degree glossiness assumes a value of 70% or less, whereby reflection of external light can be inhibited, to thus preferably enhance visibility. In particular, mirror reflectivity more preferably assumes a value of 1% or less and most preferably a value of 0.5% or less. Haze is set so as to range from 20% to 50%; a value (ratio) of internal haze/total haze is set so as to range from 0.3 to 1. A decrease of a haze value achieved before the light scattering layer to a haze value achieved after formation of the low refractive layer is set so as to come to a value of 15% or less; transmission image definition achieved at a comb width of 0.5 mm is set so as to range from 20% to 50%; and a transmissivity ratio of vertical transmitted light/transmitted light at an angle of two degrees with reference to the vertical direction is set so as to range from 1.5 to 5.0. As a result, prevention of glaring of the high definition LCD panel and lessening of blurring to characters, or the like, are preferably accomplished.

(Low Refractive Layer)

A refractive index of the low refractive layer of the antireflection film of the present invention ranges from 1.20 to 1.49 and preferably from 1.30 to 1.44. Moreover, it is desirable that the low refractive layer should satisfy Expression (IX) provided below in terms of a decrease in refractivity.

$$(m\lambda/4) \times 0.7 < n1d1 < (m\lambda/4) \times 1.3 \qquad \text{Numerical Expression (IX):}$$

In the expression, reference symbol "m" denotes a positive odd number; n1 denotes a refractive index of the low refractive layer; and d1 denotes a thickness (nm) of the low refractive layer. Further, reference symbol λ denotes a wavelength that ranges from 500 to 550 nm.

Raw materials used for forming the low refractive layer of the present invention is described below.

The low refractive layer of the present invention contains, as a low refractive binder, fluorine-containing polymer. A preferred fluorine polymer is a fluorine-containing polymer that exhibits a dynamic friction coefficient of 0.03 to 0.20, a contact angle of 90 degrees to 120 degrees with respect to water, a purified-water downward angle of 70 degrees or less and that forms a cross-link by means of heat or ionizing radiation. When the antireflection film of the present invention is attached to an image display device, a seal or a note preferably becomes easier to peel off after having been attached to the film as peel force of the film with respect to a commercial adhesive tape becomes lower. Preferable peel force is 500 gf or less; more preferably 300 gf or less; and most preferably 100 gf or less. Further, as surface hardness measured by a micro-hardness meter is larger, the low refractive layer becomes susceptible to flaws. Surface hardness is preferably 0.3 GPa or more and, more preferably, 0.5 GPa or more.

In addition to hydrolysates and dehydrated condensates of a perfluoro-alkyl-radical-containing silane compound [e.g., (heptadecafluoro-1,1,2,2-tetrahydrodecyl)triethoxysilane], fluorine-containing copolymers that contain as constituent components a fluorine-containing monomeric unit and a constitutional unit for imparting a crosslinking reactivity are mentioned as the fluorine-containing polymer used for the low refractive layer.

Specific examples of fluorine-containing monomer include; for instance, fluoro-olefins (e.g., fluoroethylene, vinylidene fluoride, tetrafluoroethylene, perfluoro-octyl ethylene, hexafluoropropylene, perfluoro-2,2-dimethyl-1,3-dioxol, and the like), fractionally or completely fluorinated alkylester derivatives of a (meth)acrylic acid [e.g., VISCOAT 6FM (manufactured by Osaka Organic Chemical Industry Ltd.), M-2020 (manufactured by Daikin Industries Ltd.), or the like], completely or fractionally fluorinated vinyl ethers, and the like. Perfluoro-olefins are preferable. However, from the viewpoint of a refractive index, solubility, transparency availability, and others, hexafluoropropylene is particularly preferable.

Constitutional units used for imparting a crosslinking reactivity include a constitutional unit produced as a result of polymerization of monomers previously including self-crosslinking functional group within molecules, like glycidyl (meth)acrylate and glycidyl vinyl ether; a constitutional unit produced as a result of polymerization of monomers having carboxyl radicals, hydroxyl radicals, amino radicals, sulfo radicals, and others [e.g., a (meth)acrylic acid, methylol (meth)acrylate, hydroxyalkyl (meth)acrylate, allyl acrylate, hydroxy ethyl vinyl ether, hydroxyl butyl vinyl ether, a maleic acid, a crotonic acid, and others]; and a constitutional unit produced by introducing a crosslinking reactive radical, like a (meth)acryloyl radical, and the like, into any of the foregoing constitutional units by means of polymeric reaction (introduction can be effected by means of; for instance, a technique for causing a chloride acrylate to react with hydroxyl radical).

In addition to the fluorine monomeric unit and the constitutional units used for imparting crosslinking reactivity, monomers that do not include fluorine atoms can also be copolymerized, as required, from the viewpoint of solution solubility, film transparency, and the like. Monomeric units that can be used in combination are not particularly limited and include; for instance, olefins (ethylene, propylene, isoprene, vinyl chloride, vinylidene chloride, and the like), acrylates (methyl acrylate, methyl acrylate, ethyl acrylate, 2-ethylhexyl acrylate), methacrylate esters (methyl methacrylate, ethyl methacrylate, butyl methacrylate, ethylene glycol dimethacrylate, and the like), styrene derivatives (styrene, divinylbenzene, vinyltoluene, α-methyl styrene, and the like), vinyl ethers (methyl vinyl ether, ethyl vinyl ether, cyclohexyl vinyl ether, and the like), vinyl esters (vinyl acetate, vinyl propionate, vinyl cinnamate, and the like), acrylamides (N-tert-butyl acrylamide, N-cyclohexyl acrylamide, and the like), methacrylamides, acrylonitrile derivatives, and the like.

A curative agent can be used in combination with any of the above-mentioned polymers, as required, as described in connection with JP-A-10-25388 and JP-A-10-147739.

(Light Scattering Layer)

A light scattering layer is formed with a view toward providing a film with a light diffusion characteristic attributable to surface scattering and/or internal scattering and a hardcoating characteristic for enhancing abrasion resistance of a film. Accordingly, the light scattering layer is formed from a binder for imparting a hardcoating characteristic, mat particles for imparting a light diffusion characteristic, and, as required, an inorganic filler for enhancing a refractive index, preventing crosslink contraction, and enhancing intensity.

From the viewpoint of imparting of a hardcoating characteristic, prevention of occurrence of a curl, and inhibition of worsening of brittleness, a thickness of the light scattering layer preferably ranges from 1 μm to 10 μm and, more preferably, from 1.2 μm to 6 μm.

A preferred binder for the scattering layer is a polymer that includes, as a principal chain, a saturated hydrocarbon chain or a polyether chain. A polymer including, as a principal chain, a saturated hydrocarbon chain is more preferable. It is preferable for a binder polymer to have a crosslinking structure. A preferred binder polymer having, as a principal chain, a saturated hydrocarbon chain is a polymer consisting of an unsaturated ethylene monomer. A preferred binder polymer having, as a principal chain, a saturated hydrocarbon chain and a crosslinking structure is a (co)polymer consisting of a monomer having two unsaturated ethylene radicals or more. In order to provide the binder polymer with a high refractive index, it is also possible to select a polymer including, in its monomer structure, at least one atom selected from the group consisting of an aromatic ring, a halogen atom except fluorine, a sulfur atom, a phosphorus atom, and a nitrogen atom.

Monomers including two unsaturated ethylene radicals or more include an ester consisting of polyhydric alcohol and a (meth)acrylic acid [e.g., an ethylene glycol di(meth)acrylate, a butanediol di(meth)acrylate, a hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, and polyester polyacrylate], denaturalized ethylene oxides of the above, vinylbenzene and derivatives thereof (e.g., 1,4-divinylbenzene, 4-vinyl benzoate-2-acryloylethylester, and 1,4-divinyl cyclohexanone), vinyl sulfone (e.g., divinyl sulfone), acrylamide (e.g., methylenebisacrylamide), and methacrylamide. Two types of monomers or more can be used in combination.

Specific examples of high refractive monomer include bis (4-methacryloyl thiophenyl)sulfide, vinyl naphthalene, vinyl phenyl sulfide, 4-methacryloxyphenyl-4'-metoxyphenylthioether, and the like. Two types of monomers of the above or more can also be used in combination.

Polymerization of a monomer including the unsaturated ethylene radicals can be performed in the presence of free radical photoinitiators or free radical thermoinitiators and by means of irradiation of ionization radiation or heating.

Accordingly, an antireflection film can be made by means of: preparing a coating fluid including a monomer having unsaturated ethylene radicals, the free radical photoinitiators or thermoinitiators, mat particles, and inorganic fillers; applying the coating fluid over a transparent support; and subsequently hardening the coating fluid through polymerizing reaction stemming from irradiation of ionization radiation or heating. Any one of known free radical photoinitiators can be used as the free radical photoinitiator.

Ring-opening polymers of polyfunctional epoxy compounds are preferable as the polymer including polyether as the principal chain. Ring-opening polymerization of a multifunctional epoxy compound can be performed in the presence of a photoacid generator or a thermal acid generator by means of irradiation of ionization radiation or heating.

Accordingly, an antireflection film can be made by means of preparing a coating fluid including a multifunctional epoxy compound, the photoacid generator or the thermal acid generator, the mat particles, and an inorganic filler, applying the coating fluid over the transparent support, and hardening the coating fluid through polymerizing reaction stemming from irradiation of ionization radiation or heating.

Alternatively, crosslinking functional radicals can also be introduced into a polymer by use of a monomer including crosslinking functional radicals in place of or in addition to the monomer including two unsaturated ethylene radicals or more. Further, the crosslinking structure can be introduced into a binder polymer by means of reaction of the crosslinking functional radicals.

Example crosslinking functional radicals include an isocyanate radical, an epoxy radical, an aziridine radical, an oxazoline radical, an aldehyde radical, a carbonyl radical, a hydrazine radical, a carboxyl radical, a methylol radical, and an active methylene radical. In addition, a vinyl sulfonic acid, an acid anhydride, a cyanoacrylate derivative, melamine, etherified methylol, ester, urethane, and a metal alkoxide like tetramethoxy silane, can also be used as a monomer for introducing a crosslinking structure. A functional radical showing a crosslinking characteristic as a result of being subjected to decomposition reaction, like a block isocyanate radical, can also be used. Specifically, a crosslinking functional radical employed in the invention can also be one that does not immediately exhibit a reaction but exhibit reactivity as a result of being decomposed.

After having been applied, the binder polymer including the crosslinking functional radicals can form a crosslinking structure when heated.

With a view toward imparting an antidazzling characteristic to a light scattering layer, the light scattering layer includes mat particles that are greater than filter particles and that have an average particle size of 1 µm to 10 µm and, preferably, 1.5 µm to 7.0 µm; for instance, particles of an inorganic compound or resin particles.

Specific example mat particles preferably include; for instance, inorganic compound particles like silica particles and $TiO_2$ particles; and resin particles like acrylic particles, crosslinking acrylic particles, polystyrene particles, crosslinking styrene particles, melamine resin particles, and benzoguanamine resin particles. Among them, the crosslinking styrene particles, the crosslinking acrylic particles, the crosslinking acrylic styrene particles, and the silica particles are preferable. A shape of the mat particles can assume either a spherical shape or an indefinite shape.

Further, mat particles having two types of particle sizes or more may be used in combination. It is possible to impart an antidazzling characteristic to the light scattering layer by means of mat particles having greater particle sizes and impart another optical characteristic to the same by means of mat particles sizes of smaller sizes.

The most preferable particle size distribution of the mat particles is monodispersive. Particles that are more equal to each other in terms of a particle size are more preferable. For instance, particles whose sizes are greater than an average particle size by 20% or more are defined as coarse particles, a proportion of coarse particles is preferably 1% or less of a total number of particles; more preferably 0.1% or less of the total number of particles; and furthermore preferably 0.01% or less of the total number of particles. Mat particles having such a particle size distribution are obtained by classification after having undergone normal synthetic reaction. A mat agent exhibiting a more preferable distribution can be produced by increasing the number of times classification is performed or the degree of classification.

The mat particles are included in the light scattering layer in such a way that an amount of mat particles in a resultantly produced light scattering layer preferably comes to 10 mg/m$^2$ to 1000 mg/m$^2$ and more preferably 100 mg/m$^2$ to 700 mg/m$^2$.

A granularity distribution of the mat particles is measured by means of a Coulter counter method, and the thus-measured distribution is converted into a particle number distribution.

In order to increase a refractive index factor of the light scattering layer, it is desirable that, in addition to including the mat particles, the light scattering layer should include inorganic filler that is made of at least one type of metallic oxide selected from titanium, zirconium, aluminum, indium, zinc, tin, and antimony and that have an average particle size of 0.2 µm or less, preferably an average particle size of 0.1 µm or less, and more preferably an average particle size of 0.06 µm or less.

Conversely, in order to increase a difference between the refractive index of the mat particles and the refractive index of the light scattering layer, a light scattering layer employing highly refractive mat particles preferably use silicon oxides for keeping the refractive index of the light scattering layer low. Preferable particle sizes are the same as those of the inorganic fillers.

Specific example inorganic fillers employed in the light scattering layer include $TiO_2$, $ZrO_2$, $Al_2O_3$, $In_2O_3$, $ZnO$, $SnO_2$, $Sb_2O_3$, ITO, $SiO_2$, and the like. $TiO_2$ and $ZrO_2$ are particularly preferable in terms of an increase in refractive index. It is also preferable that a surface of the inorganic filler be subjected to silane coupling treatment or titanium coupling treatment. In this case, a surface preparing agent having functional radicals capable of reacting with binder species on surfaces of the fillers is preferably used.

An amount of inorganic filler to be added preferably accounts for 10% to 90%; more preferably 20% to 80%; and particularly preferably 30% to 70% of a total mass of the light scattering layer.

Since the particle size of such a filler is sufficiently smaller than a wavelength of light, scattering does not arise. A dispersing element formed from the fillers dispersed in the binder polymer behaves like an optically uniform substance.

A refractive index of a bulk that is a mixture of the binder and the inorganic filler of the light scattering layer preferably ranges from 1.48 to 2.00 and more preferably from 1.50 to 1.80. The essential requirement for making a refractive index fall within the ranges is to select, appropriately, types of the binder and the inorganic filler and a quantity ratio of the binder to the inorganic filler. The way to perform selection can be readily known in advance by means of a test.

In order to assure sheet uniformity in view of coating unevenness, drying unevenness, point imperfections, and the like, the light scattering layer includes, in its coating composition used for forming an antidazzling layer, a fluorine-based surfactant or a silicon-based surfactant or both of them. In particular, when added in small amount, a fluorine-based surfactant yields an advantage of lessening sheet defects, like coating unevenness, drying unevenness, and point imperfections, in the antireflection film of the present invention. Hence, the fluorine-based surfactant is preferably used. The objective of application of the surfactant is to impart high-speed coating suitability to the protective film while enhancing sheet uniformity, thereby increasing productivity.

In order to let the view-side protective film of the second polarizing plate fulfill |Rth|≦20, the light scattering layer preferably satisfies |Rth|≦2.

An explanation is now given to an antireflection layer formed by stacking a middle refractive layer, a highly refractive layer, and a low refractive layer, in this sequence, on the view-side protective film of the second polarizing plate.

The antireflection film made up of a laminar structure built from at least the middle refractive layer, the highly refractive layer, and the low refractive layer (the outermost layer) laid, in this sequence, on a substrate is designed so as to have refractive indices that satisfy the following relationship.

The refractive index of the highly refractive layer>the refractive index of the middle refractive layer>the refractive index of the transparent support>the refractive index of the low refractive layer Moreover, a hardcoating layer can also be interposed between the transparent support and the middle refractive layer. Furthermore, the antireflection layer can also be made up of a middle refractive hardcoating layer, the highly refractive layer, and the low refractive layer (see; for instance, JP-A-8-122504, JP-A-8-110401, JP-A-10-300902, JP-A-2002-243906, JP-A-2000-111706, and the like). Moreover, each of the layers can also be additionally given another function. For instance, an antireflection layer including a low refractive layer having an antifouling characteristic and a highly refractive layer having an antistatic characteristic (e.g., JP-A-10-206603, JP-2002-243906, and the like) is mentioned.

Intensity of the antireflection film is preferably H or more according to a pencil hardness test conforming to JIS K5400, more preferably 2H or more, and most preferably 3H or more.
(Highly Refractive Layer and Middle Refractive Layer)

A highly refractive layer of the antireflection film is made up of a curable film including at least inorganic compound ultrafine particles that have an average particle size of 100 nm or less and that has a high refractive index and a matrix binder.

An inorganic compound having a refractive index of 1.65 or more is mentioned as highly refractive inorganic compound fine particles. The inorganic compound preferably has a refractive index of 1.9 or more. For instance, an oxide, like Ti, Zn, Sb, Sn, Zr, Ce, Ta, La, and In, a composite oxide including a metallic atom of any of the oxides, or the like, are mentioned.

The way to realize such ultrafine particles includes subjecting surfaces of particles to treatment by use of a surface preparation agent (e.g., a silane coupling agent, or the like, described in connection with JP-A-11-295503, JP-A-11-153703, and JP-A-2000-9908; an anionic compound or an organic metal coupling agent described in connection with JP-A-2001-310432; or the like); realizing a core shell structure that takes highly refractive particles as cores (as described in JP-A-2001-166104, JP-A-2001-310432, and the like); combined use of a specific dispersing agent (as described in; for instance, JP-A-11-153703, U.S. Pat. No. 6,210,858, JP-A-2002-2776069, and the like); and the like.

Materials that form a matrix include hitherto known thermoplastic resins, hitherto known curable resin coatings, and the like.

Moreover, a preferred material is at least one type of composition selected from a multifunctional-compound-containing composition having at least two polymerizable radicals formed from a radical polymerizable group and/or a cationic polymerizable group and a composition including an organic metallic compound having a hydrolyzable group and a partial condensate thereof. Compositions described in; for instance, JP-A-2000-47004, JP-A-2001-315242, JP-A-2001-31871, JP-A-2001-296401, and the like, are provided. Further, a colloidal metallic oxide formed from a hydrolyzed condensate of metal alkoxide and a curable film produced from a metal alkoxide composition is also preferable. The curable film is described in; for instance, JP-A-2001-293818, or the like.

A refractive index of the highly refractive layer generally ranges from 1.70 to 2.20. A thickness of the highly refractive layer ranges from 5 nm to 10 μm and more preferably from 10 nm to 1 μm.

A refractive index of the middle refractive layer is controlled so as to assume a value falling in a range between a refractive index of the low refractive layer and the refractive index of the highly refractive layer. The refractive index of the middle refractive layer preferably ranges from 1.50 to 1.70. A thickness of the middle refractive layer preferably ranges from 5 nm to 10 μm and more preferably from 10 nm to 1 μm.
(Low Refractive Layer)

The low refractive layer is sequentially stacked on the highly refractive layer. The refractive index of the low refractive layer ranges from 1.20 to 1.55 and, more preferably, from 1.30 to 1.50.

It is preferable that the low refractive layer be formed as the outermost layer exhibiting abrasion resistance and an antifouling characteristic. Imparting lubricity to a surface of the low refractive layer is effective as means for greatly enhancing abrasion resistance. Hitherto known means of a thin film layer including introduction of silicon, introduction of fluorine, and the like, is applicable.

A refractive index of a fluorine-containing compound preferably ranges from 1.35 to 1.50 and more preferably from 1.36 to 1.47. A compound that includes crosslinking or polymeric functional radicals including 35 mass % to 80 mass % of fluorine atom is preferable as the fluorine-containing compound.

There are mentioned compounds described in; for instance, paragraph numbers (0018) to (0026) in JP-A-9-222503; paragraph numbers (0019) to (0030) in JP-A-11-38202; paragraph numbers (0027) to (0028) in JP-A-2001-40284; JP-A-2000-284102, and the like.

The silicon compound corresponds to a compound having a polysiloxane structure. A preferred compound contains a curable functional radical or a polymerizable functional radical in a macromolecular chain and includes a cross linking structure in a film. For instance, reactive silicone [e.g., Silaplane produced by Chisso Corporation, or the like], polysiloxane including silanol radicals at both ends (described in JP-A-11-258403, and the like), and others, are mentioned.

It is desirable that crosslinking or polymeric reaction of a fluorine-containing polymer and/or siloxane polymer having a crosslink or a polymerizable group should be performed by exposing the polymer to light or heating the polymer concurrently when there is applied a coating composition for making the outermost layer including a polymerization initiator, a sensitizing agent, or the like, or after application of the coating composition.

Another preferred film is a sol-gel hardened film that is formed by hardening an organic metal compound, like a silane coupling agent, and a silane coupling agent including a specific fluorine-containing hydrocarbon radical in the presence of a catalyst through condensation reaction.

For instance, there are mentioned a polyfluoroalkyl-group-containing silane compound or a partially hydrolyzed condensate (compounds described in JP-A-58-142958, JP-A-58-147483, JP-A-58-147484, JP-A-9-157582, and JP-A-11-106704), a silyl compound including a poly-perfluoro-alkyl-ether radical that is a fluorine-containing a long chain radical (compounds described in JP-A-2000-117902, JP-A-2001-48590, JP-A-2002-53804, and others), and the like.

In addition to the additive mentioned above, the low refractive layer can include a filler (e.g., a low refractive inorganic compound having an average primary particle size of 1 nm to 150 nm, like silicon dioxide (silica), fluorine-containing particles (magnesium fluoride, calcium fluoride, and barium fluoride), an organic fine particle described in paragraph numbers (0020) to (0038) in JP-A-11-3820, and the like), a silane coupling agent, a lubricant, and a surfactant, or the like.

When the low refractive layer is to be situated below the outermost layer, the low refractive layer can also be formed by means of a gas phase process (a vacuum deposition technique, a sputtering technique, an ion plating technique, a plasma CVD technique, and the like). A coating method is desirable because it enables inexpensive production of the low refractive layer.

A thickness of the low refractive layer preferably ranges from 30 nm to 200 nm; more preferably from 50 nm to 150 nm; and most preferably from 60 nm to 120 nm.
(Another Layer for the Antireflection Layer)

In addition, a hardcoating layer, a forward scattering layer, a primary layer, an antistatic layer, an undercoating layer, a protective layer, and others, can be provided.
<Image Display Device>

The second polarizing plate of the present invention is placed on the view side of the image display device, thereby being able to diminish crosstalk occurring in the image display device. When used in a display panel of the image display device, the second polarizing plate is not confined to any particular restrictions. The polarizing plate can be employed in a CRT or a flat panel display. However, the flat panel display is preferable for the second polarizing plate. A PDP, an LCD, an organic ELD, and others, can be used as the flat panel display. The present invention can be particularly preferably applied to a case where the image display panel is a liquid crystal display panel. So long as a liquid crystal display panel is used as the image display panel, there can be provided an inexpensive high quality image display device among flat panel displays.

<Liquid Crystal Display Device>

The liquid crystal display device of the present invention can be used for a liquid crystal cell and a liquid crystal display device in various display modes. The liquid crystal display device can preferably be used in various display modes, like a TN (Twisted Nematic) mode, an IPS (In-Plane Switching) mode, an FLC (Ferroelectric Liquid Crystal) mode, an AFLC (Anti-ferroelectric Liquid Crystal) mode, an OCB (Optically Compensatory Bend) mode, an STN (Supper Twisted Nematic) mode, a VA (Vertically Aligned) mode, and an HAN (Hybrid Aligned Nematic) mode.
<Third Polarizing Plate>

A preferred embodiment for the present invention is one in which an image is recognized through an glasses-shaped polarizing plate in order to let a viewer recognize a stereoscopic image called a 3D image.
<Polarizing Glasses>
<Polarizing Glasses>

An image display system of the present invention preferably includes polarizing glasses in which a slow axis of a right-eye glass and a slow axis of a left-eye glass are orthogonal to each other. The system is preferably configured in such a way that right-eye image light exiting from the first region or the second region of a patterning retardation layer passes through the right-eye glass and is blocked by the left-eye glass; and that left-eye image light exiting from a remaining one of the first and second regions of the patterning retardation layer passes through the left eye glass and is blocked by the right-eye glass.

Naturally, the polarizing glasses are formed from a retardation functional layer arranged so as to deal with the patterning retardation described in detail in connection with the present invention and a linear polarizer. Incidentally, another member having a function equivalent to the linear polarizer can also be used.

A specific configuration of the image display system of the present invention, including the polarizing glasses, is now described. First, the patterning retardation layer is provided with the first region and the second region which are placed on plural first lines and plural second lines (those may be placed on horizontal odd lines and horizontal even lines when the lines are horizontally oriented or on vertical odd lines and vertical even lines when the lines are vertically oriented) repeated by turns on the image display panel and which have different polarization conversion functions. When circularly polarized light is utilized for a display, each of retardations of the first region and the second region is preferably a $\lambda/4$. More preferably, the slow axis of the first region and the slow axis of the second region are orthogonal to each other.

When circularly polarized light is utilized, a retardation value of the first region and a retardation value of the second region each are taken as a $\lambda/4$. A right-eye image is displayed on odd lines of the image display panel. When the slow axis of an odd line retardation region lies in a direction of 45 degrees, it is preferable to place a quarter plate on the right-eye glass and the left-eye glass of the polarizing glasses. Moreover, the slow axis of the quarter plate of the right-eye glass of the polarizing glasses is fixed to an angle of about 45 degrees. Under the above mentioned circumstance, a left-eye image is likewise displayed on the even lines of the image display panel. When the slow axis of the even line phase different region is oriented in a direction of 135 degrees, the slow axis of the left eye glass of the polarizing glasses is specifically fixed to an angle of about 135 degrees.

Further, from the viewpoint of a polarized state of the image light once exited as circularly polarized light from the patterning retardation layer being restored to its original state by means of the polarizing glasses, it is desirable that an angle of the slow axis used for fixing the right-eye glass in the above example should become accurately closer to 45 degrees in the horizontal direction. Moreover, it is desirable that the angle of the slow axis used for fixing the left-eye glass should become accurately closer to 135 degrees (or −45 degrees) in the horizontal direction.

When the image display panel is a liquid crystal display panel, an absorption axis of a front-side polarizing plate of the liquid crystal display panel is usually oriented in a horizontal direction. Therefore, it is preferable that an absorption axis of the linear polarizer of the polarizing glasses is oriented in a direction orthogonal to the direction of the absorption axis of the front-side polarizing plate. It is more preferable that the absorption axis of the linear polarizer of the polarizing glasses be oriented in the vertical direction.

Moreover, in terms of efficiency of polarization conversion, it is preferable that the direction of the absorption axis of the front-side polarizing plate of the liquid crystal display panel preferably should form an angle of 45 degree with respect to the respective phase lag axes of the odd line retardation region and the even line retardation region of the patterning retardation layer.

A preferred layout of such polarizing glasses, the patterning retardation layer, and the liquid crystal display device is disclosed in; for instance, JP-A-2004-170693.

Polarizing glasses described in JP-A-2004-170693, a commercially available accessory ZM-M220 W produced by Zalman can be mentioned as example polarizing glasses.

<Retardation>

Re and Rth are defined by the following expressions with regard to an object.

$Re=(nx-ny) \times d$ $Rth=((nx+ny)/2-nz) \times d$ (Expression (2) which will be described later).

In the expressions, reference symbol "nx" denotes a refractive index along a direction of a slow axis in a plane of the object; "ny" denotes a refractive index along the direction orthogonal to "nx" within the plane; and "nz" denotes a refractive index in the direction orthogonal to "nx" and "ny." Reference symbol "d" denotes a film thickness of the object along the direction "nz."

<Measurement Method>

In the specification, reference symbols Re(λ) and Rth(λ) denote retardation in a plane and retardation in a thickness direction, respectively, at the wavelength λ. Re(λ) is measured by letting light having a wavelength λ nm fall on a film along a direction normal thereto by means of KOBRA 21ADH or WR (manufactured by Oji Scientific Instrument). When a measurement wavelength λ nm is selected, measurement can be performed by means of manually replacing a wavelength selection filter or converting a measurement value through use of a program, or the like.

When a film to be measured is represented by an uniaxial or biaxial index ellipsoid, Rth(λ) is calculated by the following method.

Rth(λ) is calculated by KOBRA 21ADH or WR as follows. Re(λ) is measured at six points by taking the slow axis in the plane (determined by KOBRA 21ADH or WR) as an inclination axis (a rotary axis). The inclination axis is inclined every 10 degrees to 50 degrees on one side from the normal direction of the film (when the slow axis is not available, an arbitrary direction in the film plane is taken as a rotary axis) with reference to the normal direction. Light having a wavelength λ nm is caused to enter the film along respective inclined directions, whereby Re(λ) is measured at a total of six points. KOBRA 21ADH or WR calculates Rth(λ) from the thus-measured retardation values, an assumed value of an average refractive index, and an input film thickness value.

In relation to the above descriptions, in the case of a film having a direction in which the retardation value achieved at a certain angle of inclination from the normal direction comes to zero while the slow axis in the plane is taken as a rotary axis, a retardation value achieved at an angle of inclination that is greater than the angle of inclination is given a negative sign, and KOBRA 21ADH or WR then calculates Rth(λ) from the retardation value with the negative sign.

Moreover, the slow axis is taken as an inclination axis (the rotary axis) (when the slow axis is not available, an arbitrary direction within a film plane is taken as a rotary axis), and retardation values are measured in arbitrary two inclined directions. Rth can also be calculated from the thus-measured values, the assumed value of the average refractive factor, and the input film thickness value according to Expressions (1) and (2) provided below.

$$Re(\theta) = \left[ nx - \frac{ny \times nz}{\left( \sqrt{\left\{ ny \sin\left( \sin^{-1}\left( \frac{\sin(-\theta)}{nx} \right) \right) \right\}^2 + \left\{ nz \cos\left( \sin^{-1}\left( \frac{\sin(-\theta)}{nx} \right) \right) \right\}^2} \right)} \right] \times \frac{d}{\cos\left\{ \sin^{-1}\left( \frac{\sin(-\theta)}{nx} \right) \right\}}$$ Expression (1)

Re(θ) in the expression denotes a retardation value in a direction inclined at an angle of θ with respect to the normal direction.

In Expression (1), reference symbol "nx" denotes a refractive index in the direction of the slow axis in the plane; "ny" denotes a refractive index in the direction orthogonal to "nx" in the plane; and "nz" denotes a refractive index in the direction orthogonal to nx and ny. Reference symbol "d" denotes a film thickness.

$Rth=((nx+ny)/2-nz) \times d$  Expression (2):

In Expression (2), "nx" denotes a refractive index in the direction of the slow axis in a plane; "ny" denotes a refractive index in a direction orthogonal to nx in the plane; and "nz" denotes a refractive index in a direction orthogonal to nx and ny.

When a film to be measured is one that cannot be expressed by an uniaxial or biaxial index ellipsoid; namely, a so-called film not having an optical axis, Rth(λ) is calculated by the following method.

Rth(λ) is calculated by KOBRA 21ADH or WR as follows. Re(λ) is measured at eleven points by taking the slow axis in the plane (determined by KOBRA 21ADH or WR) as an inclination axis (a rotary axis). The inclination axis is inclined every 10 degrees from −50 degrees to +50 degrees with reference to the normal direction of the film. Light having a wavelength λ nm is caused to enter the film along respective inclined directions, whereby Re(λ) is measured at eleven points. KOBRA 21ADH or WR calculates Rth(λ) from the thus-measured retardation values, an assumed value of an average refractive index, and an input film thickness value.

In the measurement, a value on a polymer handbook (JOHN WILEY & SONS, INC.) or a catalogue of each of various types of optical films can be used as the assumed value of the average refractive index. A film whose average refractive index value is unknown can be measured by means of an Abbe's refractometer. Average refractive indices of principal optical films are exemplified as follows: cellulose acylate (1.48), cycloolefin polymer (1.52), polycarbonate (1.59), polymethyl methacrylate (1.49), and polystyrene (1.59). Upon receipt of an input of the assumed value of the average refractive index and the film thickness, KOBRA 21ADH or WR calculates nx, ny, and nz. Nz=(nz−nz)/(nx−ny) is further calculated from the thus-calculated nx, ny, and nz.

EXAMPLES

The present invention is now additionally specifically explained by reference to examples provided below. Amounts and proportions of materials, reagents, and substances, operations, and the like, described in the following examples can be changed appropriately unless they depart from the spirit of the present invention. Accordingly, the scope of the present invention is not restricted to specific examples provided below.

Examples 1 through 13 and Comparative examples 1 through 9 provided below are directed toward manufacture of a polarizing plate making up the liquid crystal display device of the present invention, in particular, to manufacture of a second polarizing plate that is a polarizing plate on a view side among a pair of polarizing plates placed on both sides of a liquid crystal cell.

Example 1

<<Production of a Cellulose Acylate Film 001>>
(Preparation of Cellulose Acylate)

Cellulose acylate having a total substitution degree of 2.97 (a breakdown: an acetyl substitution degree of 0.45 and a propionyl substitution degree of 2.52) was prepared. A mixture including (7.8 parts by mass of) a sulfuric acid serving as a catalyst (with respect to 100 parts by mass of cellulose) and carboxylic acid anhydride was cooled to −20 degrees centigrade. The mixture was added to cellulose derived from pulp, and the cellulose was acylated at 40 degrees centigrade. A type and an amount of carboxylic acid anhydride were regulated at this time, whereby the type of acyl radicals and a substitution ratio of the acyl radicals were controlled. The mixture was aged at 40 degrees centigrade after acylation, thereby having adjusted a total degree of substitution.
(Preparation of a Cellulose Acylate Solution)

1) Cellulose Acylate

Prepared cellulose acylate was heated to 120 degrees centigrade, to thus be dried. After a moisture content had been decreased to 0.5 mass % or less, 30 parts by mass of cellulose acylate were mixed with a solvent.

2) Solvent (81/15/4 parts by mass of) dichloromethane/methanol/butanol were used as a solvent. A moisture content of each of the solvents was 0.2 mass %.

3) Additive 0.9 parts by mass of trimethylolpropane triacetate were added at the time of preparation of all solutions. Further, 0.25 parts by mass of silicon dioxide fine particles (having a particle size of 20 nm and a Mohs hardness of about 7) were added at the time of preparation of all of the solutions.

4) Swelling and Dissolution

The solvent and the additive were cast in a solution tank that has an agitating blade; that is made of stainless steel; that has 400 liter capacity; and whose outer periphery is cooled by a circulation of cooling water. Cellulose acylate was gradually added to the mixture while the solvent and additive were being agitated and dispersed. The mixture was agitated for two hours at room temperature after completion of casting of the solvent and the additive. After having been swelled for three hours, the mixture was again agitated, whereby a cellulose acylate solution was obtained.

A dissolver-type eccentric agitator shaft that performs agitation at circumferential velocity of 15 m/sec (shear stress of $5\times10^4$ kgf/m/sec$^2$) and an agitator shaft having an anchor vane at its center and that performs agitation at circumferential velocity of 1 m/sec (shear stress of $1\times10^4$ kgf/m/sec$^2$) were used for agitation. Swelling was performed by stopping the high speed agitator shaft and setting the circumferential velocity of the agitator shaft having the anchor vane to 0.5 m/sec.

5) Filtration

The thus-prepared cellulose acylate solution was filtrated by use of filter paper having absolute filtration accuracy of 0.01 mm (#63 manufactured by Toyo Roshi Kaisha, Ltd.). A resultant solution was further filtrated by use of filter paper having absolute filtration accuracy of 2.5 μm (FH025 manufactured by Pall Corporation), whereby a cellulose acylate solution was obtained.
(Production of a Cellulose Acylate Film)

The cellulose acylate solution was heated to 30 degrees centigrade and flowed through a flow casting Geeser (described in JP-A-11-314233) and cast over a mirror stainless support having a band length of 60 m set at 15 degrees centigrade. Flow casting speed was set to 15 m/min., and a coating width was set to 200 cm. A spatial temperature of the entire flow casting block was set to 15 degrees centigrade. A flow-cast, rotated cellulose acylate film was peeled off from a band at a point 50 cm before the flow casting block, and a dry wind at 45 degrees centigrade was blown to the film. The film was then dried at 110 degrees centigrade for five minutes and additionally dried at 140 degrees centigrade for ten minutes, whereby a cellulose acylate film 001 was produced (a film thickness of 81 μm).

Re of the thus-produced cellulose acylate film 001 was −2 nm, and Rth of the same was −75 nm. Values measured at a wavelength of 550 nm by use of an automatic birefringent meter KOBRA-21ADH (manufactured by Oji Scientific Instrument) were used for Re and Rth.
(Production of an Optical Film 101 Coated with an Optically Anisotropic Layer)

A surface of the thus-produced cellulose acylate film 001 was saponified by an alkaline solution. An oriented film coating liquid having the following composition was applied over the film by means of a wire bar coater at a rate of 20 ml/m². The film was dried by means of a hot wind at 60 degrees centigrade for 60 seconds and further dried by means of a hot wind at a temperature of 100 degrees centigrade for 120 seconds, to thus have made a film. The thus-formed film was subjected to rubbing treatment at an angle of 45 degrees with respect to a longitudinal direction of the cellulose acylate film 001, to thus form an oriented film.

Composition of an Aligned Film Coating Liquid

| | |
|---|---|
| Modified polyvinyl alcohol described below | 10 parts by mass |
| Water | 371 parts by mass |
| Methanol | 119 parts by mass |
| Glutaraldehyde | 0.5 parts by mass |

Modified polyvinyl alcohol

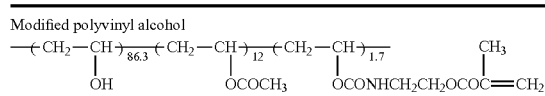

The optically anisotropic layer coating fluid having the following composition was applied by means of the wire bar.

| | |
|---|---|
| Rod-shaped liquid crystal compound described below | 1.8 g |
| Ethylene oxide modified trimethylolpropane triacrylate (V#360, manufactured by Osaka Organic Chemical Industry Ltd.) | 0.2 g |
| Photopolymerization initiator (Irgacure 907, manufactured by Ciba-Geigy Ltd.) | 0.06 g |
| Sensitizer (Kayacure DETX, manufactured by Nippon Kayaku Co., Ltd.) | 0.02 g |
| Methyl ethyl ketone | 3.9 g |

The optical film was heated at 125 degrees centigrade in a temperature-controlled bath for three minutes, to thus orient a rod-shaped liquid crystal compound. The film was exposed to UV radiation for 30 seconds by use of a high voltage mercury lamp having power of 120 W/cm, thereby crosslinking the rod-shaped liquid crystal compound. The temperature achieved during UV curing was set to 80 degrees centigrade, whereby an optically anisotropic layer 011 was produced. The thickness of the optically anisotropic layer was 2.0 μm. Subsequently, the film was left standing to cool to room temperature. As mentioned above, the optical film 101 produced by coating the cellulose acylate film 001 with the optically anisotropic layer 011 was manufactured. A state of the thus-formed optically anisotropic layer 011 was examined, to thus ascertain that there was not any coating unevenness (unevenness resulting of the coating fluid being repelled by the oriented film) or orientation disarray. Table 1 shows optical characteristics of the optically anisotropic layer 011. In order to measure optical performance of only the optically anisotropic layer 011, the optically anisotropic layer 011 was formed not over the cellulose acylate film 001 but a glass substrate that was considered to exhibit no Re and Rth, through operations that were the same as those mentioned above. The thus-formed optically anisotropic layer was measured. Table 2 shows optical characteristics of the thus-manufactured optical film 101. Values measured at a wavelength of 550 nm by use of the automatic birefringent meter KOBRA-21ADH (manufactured by Oji Scientific Instrument) were used for the foregoing optical measurement.

Rod-Shaped Liquid Crystal Compound

TABLE 1

(Optical Performance of Optically Anisotropic Layer 011)

| Optically Anisotropic Layer 011 | |
|---|---|
| Thickness/μm | 2.0 |
| Re (value measured at 550 nm)/nm | 150 |
| Rth (value measured at 550 nm)/nm | 74 |

TABLE 2

(Optical Performance of Optical Film 101)

| Optical Film 101 | |
|---|---|
| Re (value measured at 550 nm)/nm | 148 |
| Rth (value measured at 550 nm)/nm | −1 |

Example 2

An optically anisotropic layer 012 provided below rather than the optically anisotropic layer 011 was formed by use of the cellulose acylate film 001 of Example 1.

<<Formation of the Optically Anisotropic Layer 012>>

(Preparation of a Polyimide Coating Fluid)

By use of 2,2'-bis(3,4-dicarboxyphenyl)hexafluoropropane dianhydride (6FDA) and 2,2'-bis(trifluoromethyl)-4,4'-diaminobiphenyl (PFMB), polyimide (Mw=150,000) formed from a repeating unit represented by the following chemical formula was synthesized. The polyimide was dissolved into 15 weight % of MIBK (methyl isobutyl ketone) solution, whereby a polyimide solution was prepared. Methods for synthesizing 6FDA and PFMB are described in detail in Japanese Patent No. 3735361.

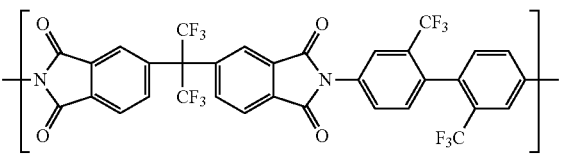

(Production of an Optical Film 102)

The polyimide solution was applied directly over the cellulose acylate film 001 produced in First Example while a thickness of the solution was regulated by use of a bar coater. The film was dried at 100 degrees centigrade for ten minutes and further dried at 150 degrees centigrade for 20 minutes, whereby the optically anisotropic layer 012 formed from polyimide to a thickness of 3.7 μm was produced. Thus, the optical film 102 integrated with the cellulose acylate film 001 was produced. The optically anisotropic layer 012 was formed over the glass substrate that was considered to exhibit no Re or Rth through operations that were the same as those mentioned above. By use of the thus-formed optically aniso-

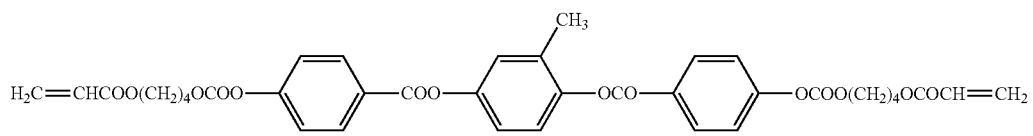

tropic layer 012, optical characteristics of the optically anisotropic layer 012 formed from polyimide (Table 3) were measured. Table 4 shows optical characteristics of the thus-produced optical film 102. Forgoing optical measurement was performed at a wavelength of 550 nm by use of the automatic birefringent meter KOBRA-21ADH (manufactured by Oji Scientific Instrument).

TABLE 3

(Optical Performance of Optically Anisotropic Layer 012)

Optically Anisotropic Layer 012

| | |
|---|---|
| Thickness/μm | 3.7 |
| Re (value measured at 550 nm)/nm | 151 |
| Rth (value measured at 550 nm)/nm | 75 |

TABLE 4

(Optical Performance of Optical Film 102)

Optical Film 102

| | |
|---|---|
| Re (value measured at 550 nm)/nm | 149 |
| Rth (value measured at 550 nm)/nm | 0 |

Comparative Example 1

(Production of an Optical Film 103)

Under the same method as that under which the optically anisotropic layer 011 was formed in Example 1, an optically anisotropic layer 013 was formed by use of a FUJITAC TD80UL manufactured by Fujifilm (having a thickness of 80 μm, and Re=4 nm and Rth=46 nm achieved at a wavelength of 550 nm) in place of the cellulose acylate film 001 employed in Example 1, whereby an optical film 103 was produced. Optical performance of the optically anisotropic layer 013 was ascertained to be equal to that of the optically anisotropic layer 011 described in connection with Example 1.

As to the optical film 103, an in-plane retardation Re value and a retardation Rth value achieved in a thickness direction of a film by measuring an Re value at different angle of inclination were determined at a wavelength of 550 nm by use of the automatic birefringent meter KOBRA-21ADH (manufactured by Oji Scientific Instrument). Table 5 shows measurement results.

TABLE 5

(Optical Performance of Optical Film 103)

Optical Film 103

| | |
|---|---|
| Re (value measured at 550 nm)/nm | 154 |
| Rth (value measured at 550 nm)/nm | 120 |

Comparative Example 2

(Production of an Optical Film 104)

Under the same method as that under which the optically anisotropic layer 011 was formed in Example 1, an optically anisotropic layer 014 was formed by use of a ZRD60S manufactured by Fujifilm (having a thickness of 60 μm, and Re=0 nm and Rth=1 nm achieved at a wavelength of 550 nm) in place of the cellulose acylate film 001 employed in Example 1, whereby an optical film 104 was produced. Optical performance of the optically anisotropic layer 014 was ascertained to be equal to that of the optically anisotropic layer 011 described in connection with Example 1.

As to the optical film 104, an in-plane retardation Re value and a retardation Rth value achieved in a thickness direction of a film by measuring an Re value at different angle of inclination were determined at a wavelength of 550 nm by use of the automatic birefringent meter KOBRA-21ADH (manufactured by Oji Scientific Instrument). Table 6 shows measurement results.

TABLE 6

(Optical Performance of Optical Film 104)

Optical Film 104

| | |
|---|---|
| Re (value measured at 550 nm)/nm | 150 |
| Rth (value measured at 550 nm)/nm | 75 |

Comparative Example 3

(Production of a Cellulose Acylate Film 002)

Like the cellulose acylate film 001 manufactured in Example 1, the cellulose acylate film 002 of the present invention that exhibits Re=−4 nm and Rth=−150 nm at a wavelength of 550 nm was produced to a double thickness. In relation to the Re and Rth values, an in-plane retardation Re value and a retardation Rth value achieved in a thickness direction of a film by measuring an Re value at different angle of inclination were determined at a wavelength of 550 nm by use of the automatic birefringent meter KOBRA-21ADH (manufactured by Oji Scientific Instrument).

(Production of an Optical Film 105)

Under the same method as that under which the optically anisotropic layer 011 was formed in Example 1, an optically anisotropic layer 015 was formed by use of the above-produced cellulose acylate film 002 in place of the cellulose acylate film 001 employed in Example 1, whereby an optical film 105 was produced. Optical performance of the optically anisotropic layer 015 was ascertained to be equal to that of the optically anisotropic layer 011 described in connection with Example 1.

As to the optical film 105, an in-plane retardation Re value and a retardation Rth value achieved in a thickness direction of a film by measuring an Re value at different angle of inclination were determined at a wavelength of 550 nm by use of the automatic birefringent meter KOBRA-21ADH (manufactured by Oji Scientific Instrument). Table 7 shows measurement results.

TABLE 7

(Optical Performance of Optical Film 105)

Optical Film 105

| | |
|---|---|
| Re (value measured at 550 nm)/nm | 146 |
| Rth (value measured at 550 nm)/nm | −76 |

Example 3

The cellulose acylate film 001 produced in connection with Example 1 was rubbed at an angle of 45 degrees with respect to the longitudinal direction of the film. The oriented film employed in Example 1 was applied over the film by means of bar coating technique, and the thus-coated film was dried at 100 degrees centigrade for two minutes. The rod-shaped liquid crystal compound employed in Example 1 was applied over the film by means of bar coating. The thus-coated film was left at 100 degrees centigrade for two minutes and subsequently exposed to UV radiation, thereby forming an optically anisotropic layer 016 (having a thickness of 2.0 μm). Thus, an optical film 106 was produced. Re and Rth values exhibited by the optically anisotropic layer at a wavelength of 550 nm were 138 nm and 70 nm, respectively. Re and Rth values exhibited by the optical film 106 at a wavelength of 550 nm were 137.5 nm and −5 nm, respectively. The slow axis of the optically anisotropic layer 016 was inclined at an angle of 45 degrees with respect to the direction of the longitudinal side of the anisotropic layer.

Comparative Example 4

By reference to JP-A-2009-69793, a patterning retardation layer was formed at a period of 100 μm over a glass substrate in such a way that a pattern 1 exhibiting Re of 275 nm and Rth of 138 nm at a wavelength of 550 nm and a pattern 2 exhibiting Re of 0 nm and Rth of 140 nm were arranged one after the other. The layer was transferred onto the above-produced optical film 106 exhibiting Re of 137.5 nm, whereby a patterning retardation film (an optical film 107) was produced. At this time, axial directions of the films were arranged so as to become parallel to each other. Moreover, Rth exhibited by the entire optical film 107 at a wavelength of 550 nm was 134 nm.

Comparative Example 5

By reference to JP-A-2009-223001, a patterning retardation layer was formed over a glass substrate such that Re of 137.5 nm and Rth of 69 nm were exhibited at a wavelength of 550 nm and that an orientation of the slow axis came to 45 degrees to −45 degrees at a period of 100 μm. The layer was transferred over ZRD60S (having a thickness of 60 μm) manufactured by Fujifilm, whereby a patterning retardation film (an optical film 108) was produced. Moreover, Rth exhibited by the entire optical film 108 at a wavelength of 550 nm was 76 nm.

Example 4

(Preparation of Coating Fluid for a Hardcoating Layer)
Compositions provided below were cast into a mixing tank and agitated, to thus prepare a coating fluid for a hardcoating layer.
100 parts by mass of cyclohexanone, 750 parts by mass of partially-caprolactone-modified polyfunctional acrylate (DPCA-20 manufactured by Nippon Kayaku Co., Ltd.), 200 parts by mass of silica sol (MIBK-ST manufactured by Nissan Chemical Industries, Ltd.), and 50 parts by mass of photopolymerization initiator (Irgacure 184 manufactured by Ciba Specialty Chemicals Ltd.) were added to 900 parts by mass of methyl ethyl ketone and were agitated. The mixture was filtrated by means of a filter that has a pore size of 0.4 μm and that is made of polypropylene, whereby a coating fluid for a hardcoating layer was prepared.
(Preparation of Coating Fluid a for Middle Refractive Layer)
1.5 parts by mass of a mixture (DPHA) made up of dipentaerythritol penta acrylate and dipentaerythritol hexa acrylate, 0.05 parts by mass of photopolymerization initiator (Irgacure 907 manufactured by Ciba Specialty Chemicals Ltd.), 66.6 parts by mass of methyl ethyl ketone, 7.7 parts by mass of methyl isobutyl ketone, and 19.1 parts by mass of cyclohexanone were added to 5.1 parts by mass of ZrO$_2$-fine-particle-containing hardcoating agent [Desolite (Registered Trademark) Z7404 manufactured by JSR Ltd. [a refractive index of 1.72, a solid content concentration of 60 mass %, a zirconia fine particle content of 70 mass % (with respect to the solid content), an average particle size of about 20 nm of the zirconia fine particles, and a solvent composition of methyl isobutyl ketone/methyl ethyl ketone=9/1]. A resultant mixture was agitated. After having been sufficiently agitated, the mixture was filtrated by means of a filter that has a pore size of 0.4 μm and that is formed from polypropylene, whereby a coating fluid A for a middle refractive layer was prepared.
(Preparation of a Coating Fluid B for the Middle Refractive Layer)
4.5 parts by mass of a mixture (DPHA) made up of dipentaerythritol penta acrylate and dipentaerythritol hexa acrylate, 0.14 parts by mass of photopolymerization initiator (Irgacure 907 manufactured by Ciba Specialty Chemicals Ltd.), 66.5 parts by mass of methyl ethyl ketone, 9.5 parts by mass of methyl isobutyl ketone, and 19.0 parts by mass of cyclohexanone were added and agitated. After having been sufficiently agitated, a resultant mixture was filtrated by means of a filter that has a pore size of 0.4 μm and that is formed from polypropylene, whereby a coating fluid B for a middle refractive layer was prepared.
Appropriate amounts of the coating fluid A for a middle refractive layer and the coating fluid B for a middle refractive layer were mixed together, whereby a coating fluid for a middle refractive layer was prepared.
(Preparation of a Coating Fluid for a Highly Refractive Layer)
0.75 parts by mass of a mixture (DPHA) made up of dipentaerythritol penta acrylate and dipentaerythritol hexa acrylate, 62.0 parts by mass of methyl ethyl ketone, 3.4 parts by mass of methyl isobutyl ketone, and 1.1 parts by mass of cyclohexanone were added to 14.4 parts by mass of ZrO$_2$-fine-particle-containing hardcoating agent [Desolite (Registered Trademark) Z7404 manufactured by JSR Ltd. [a refractive index of 1.72, a solid content concentration of 60 mass %, a zirconia fine particle content of 70 mass % (with respect to the solid content), an average particle size of about 20 nm of the zirconia fine particles, and a photopolymerization-initiator-containing solvent composition of methyl isobutyl ketone/methyl ethyl ketone=9/1]. A resultant mixture was agitated. After having been sufficiently agitated, the mixture was filtrated by means of a filter that has a pore size of 0.4 μm and that is formed from polypropylene, whereby a coating fluid C for a highly refractive layer was prepared.
(Preparation of Coating Fluid for a Low Refractive Layer)
(Synthesis of a Perfluoro Olefin Copolymer (1))

(1):

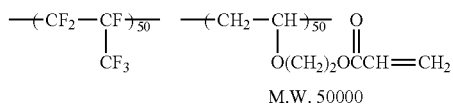

M.W. 50000

50:50 in the above structural formula denotes a mol ratio.
40 ml of ethyl acetate, 14.7 grams of hydroxyethyl vinyl ether, and 0.55 grams of dilauroyl peroxide were charged into an autoclave that has 100 ml capacity and an agitator made of stainless steel. An interior of the system was degassed and replaced with a nitrogen gas. Further, 25 grams of hexafluoro propylene (HFP) was introduced into the autoclave and heated to 65 degrees centigrade. Pressure achieved at a point in time when an internal temperature of the autoclave reached 65 degrees centigrade was 0.53 MPa (5.4 kg/cm²). Reaction was continued for eight hours while the internal temperature was maintained. When the pressure reached 0.31 MPa (3.2 kg/cm²), heating was stopped and left standing to cool. A monomer unreacted at a point in time when the internal temperature fell to room temperature was expelled from the autoclave, and the autoclave was opened to take out a resultant reaction fluid. The thus-obtained fluid was charged into largely excessive hexane, and the solvent was eliminated by decantation, whereby sedimented polymer was taken out. The polymer was further dissolved into a small quantity of ethyl acetate. The solution was sedimented twice by means of hexane, whereby remaining monomer was completely eliminated. The resultant sediment was dried, whereby 28 grams of polymer were obtained. 20 grams of the polymer were dissolved in 100 ml of N,N-dimethylacetamide, and 11.4 grams of ice cold chloride acrylate were dropped into the solution and agitated for 10 hours at room temperature. Ethyl acetate was added to the resultant reaction fluid and rinsed with water, to thus extract an organic layer. The organic layer was then condensed, to thus produce a polymer. The polymer was again sedimented by means of hexane, whereby 19 grams of perfluoro olefin copolymer (1) were produced. A refractive index of the thus-produced polymer was 1.422, and a mass average molecular weight of the polymer was 50000.

(Preparation of Hollow Silica Particle Fluid Dispersion A)

30 parts by mass of acryloyl oxypropyl trimethoxy silane and 1.51 parts by mass of diisopropoxy aluminum ethyl acetate were added to 500 parts by mass of hollow silica fine particle sol (isopropyl alcohol silica sol CS60-IPA that is manufactured by Catalysts and Chemicals Ltd. and that has an average particle size of 60 nm, a shell thickness of 10 nm, 20 mass % of silica concentration, and a silica particle refractive index of 1.31) and mixed together. 9 parts by mass of ion-exchanged water was added to the mixture. The mixture was reacted at 60 degrees centigrade for eight hours and cooled to room temperature. 1.8 parts by mass of acetylacetone were added to the mixture, whereby a fluid dispersion was produced. Subsequently, the mixture was subjected to solvent substitution at a pressure of 30 Torr through vacuum distillation while cyclohexanone was being added to the mixture in such a way that a content ratio of silica became substantially constant. A fluid dispersion A having a solid content concentration of 18.2 mass % was produced at last by means of concentration control. An amount of IPA remaining in the thus-produced fluid dispersion A was determined to be 0.5 mass % or less by means of gas chromatography analysis.

(Preparation of Coating Fluid for a Law Refractive Layer)

Respective components were mixed as follows, whereby a coating fluid for a low refractive layer having a solid content concentration of 5 mass % dissolved in methyl ethyl ketone was prepared. Mass % of each of the components corresponds to a ratio of each of solid contents with respect to all solid contents in the coating fluid.

P-1: Perfluoro olefin copolymer (1): 15 mass %

DPHA: a mixture of dipentaerythritol penta acrylate and dipentaerythritol hexa acrylate (manufactured by Nippon Kayaku Co., Ltd.): 7 mass % of MF1: An unsaturated fluorine containing the compound described below (having a weight average molecular weight 1600) described in the embodiment of the booklet of International Publication WO 2003/022906: 5 mass %

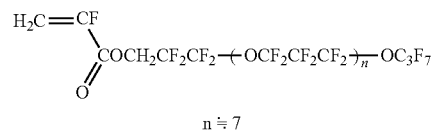

$$n \doteq 7$$

M-1: KAYARAD DPHA manufactured by Nippon Kayaku Co., Ltd.: 20 mass %

Fluid dispersion A: Hollow silica particle fluid dispersion A (a hollow silica particle sol whose surfaces are modified by acryloyl oxypropyl trimethoxy silane and that has a solid content concentration of 18.2%): 50 mass %

Irg 127: Photopolymerization initiator Irgacure 127 (manufactured by Ciba Specialty Chemicals Ltd.): 3 mass %

The coating fluid for a hardcoating layer having the above composition was applied over the optically anisotropic layer 011 of the optical film 101 produced in connection with Example 1 by use of a gravure coater. After having been dried at 100 degrees centigrade, the coating layer was exposed to UV radiation at a luminous intensity of 400 mW/cm² and a radiation dose of 150 mJ/cm² so as to become cured, by use of an air-cooled metal halide lamp (manufactured by Eye Graphics Co., Ltd.) having a luminous intensity of 160 W/cm while nitrogen was being purged in such a way that an ambient atmosphere came to include an oxygen concentration of 1.0 volume % or less, whereby a hardcoating layer A having a thickness of 12 µm was formed.

Further, the coating fluid for a middle refractive layer, the coating fluid for a highly refractive layer, and the coating fluid for a low refractive layer were applied by use of the gravure coater, whereby the middle refractive layer, the highly refractive layer, and the low refractive layer were formed.

Conditions for drying the middle refractive layer were 30 seconds at 90 degrees centigrade. In addition, conditions for curing the middle refractive layer under UV radiation were that UV radiation was irradiated at a luminous intensity of 300 mW/cm² and a radiation dose of 240 mJ/cm² by use of the air-cooled metal halide lamp (manufactured by Eye Graphics Co., Ltd.) having a luminous intensity of 180 W/cm while nitrogen was being purged in such a way that an ambient atmosphere came to include an oxygen concentration of 1.0 volume % or less. The middle refractive layer had a film thickness of 65.5 nm and exhibits a refractive index of 1.638.

Conditions for drying the highly refractive layer were 30 seconds at 90 degrees centigrade. In addition, conditions for curing the highly refractive layer under UV radiation were that UV radiation was irradiated at a luminous intensity of 300 mW/cm² and a radiation dose of 240 mJ/cm² by use of the air-cooled metal halide lamp (manufactured by Eye Graphics Co., Ltd.) having a luminous intensity of 240 W/cm while nitrogen was being purged in such a way that an ambient atmosphere came to include an oxygen concentration of 1.0 volume % or less. The highly refractive layer had a film thickness of 110 nm and exhibited a refractive index of 1.845.

Conditions for drying the low refractive layer were 30 seconds at 90 degrees centigrade. In addition, conditions for curing the low refractive layer under UV radiation were that UV radiation was irradiated at a luminous intensity of 600 mW/cm² and a radiation dose of 600 mJ/cm² by use of the air-cooled metal halide lamp (manufactured by Eye Graphics Co., Ltd.) having a luminous intensity of 240 W/cm while nitrogen was being purged in such a way that an ambient atmosphere came to include an oxygen concentration of 0.1 volume % or less. The low refractive layer had a film thickness of 86 nm and exhibited a refractive index of 1.42.

An optical film 110 having the hardcoating layer and the antireflection layer laid on the optically anisotropic layer was thus produced. As to the optical film 110, an in-plane retardation Re value and a retardation Rth value achieved in a thickness direction of the film by measuring an Re value at different angle of inclination were determined at a wavelength of 550 nm by use of the automatic birefringent meter KOBRA-21ADH (manufactured by Oji Scientific Instrument). Re was 150 nm, and Rth was −1 mm Example 5

The coating fluid for a hardcoating layer having the above composition was applied over the cellulose acylate film 001 that was a support for the optical film 101 produced in connection with Example 1 by use of the gravure coater. After having been dried at 100 degrees centigrade, the coating layer was exposed to UV radiation at a luminous intensity of 400 mW/cm$^2$ and a radiation dose of 150 mJ/cm$^2$ so as to become cured, by use of an air-cooled metal halide lamp (manufactured by Eye Graphics Co., Ltd.) having a luminous intensity of 160 W/cm while nitrogen was being purged in such a way that an ambient atmosphere came to include an oxygen concentration of 1.0 volume % or less, whereby a hardcoating layer A having a thickness of 12 μm was formed.

Further, the coating fluid for a middle refractive layer, the coating fluid for a highly refractive layer, and the coating fluid for a low refractive layer were applied by use of the gravure coater, whereby the middle refractive layer, the highly refractive layer, and the low refractive layer were formed. Thus, an optical film 111 was produced.

Conditions for drying the middle refractive layer were 30 seconds at 90 degrees centigrade. In addition, conditions for curing the middle refractive layer under UV radiation were that UV radiation was irradiated at a luminous intensity of 300 mW/cm$^2$ and a radiation dose of 240 mJ/cm$^2$ by use of the air-cooled metal halide lamp (manufactured by Eye Graphics Co., Ltd.) having a luminous intensity of 180 W/cm while nitrogen was being purged in such a way that an ambient atmosphere came to include an oxygen concentration of 1.0 volume % or less. The middle refractive layer had a film thickness of 65.5 nm and exhibited a refractive index of 1.638.

Conditions for drying the highly refractive layer were 30 seconds at 90 degrees centigrade. In addition, conditions for curing the highly refractive layer under UV radiation were that UV radiation was irradiated at a luminous intensity of 300 mW/cm$^2$ and a radiation dose of 240 mJ/cm$^2$ by use of the air-cooled metal halide lamp (manufactured by Eye Graphics Co., Ltd.) having a luminous intensity of 240 W/cm while nitrogen was being purged in such a way that an ambient atmosphere came to include an oxygen concentration of 1.0 volume % or less. The highly refractive layer had a film thickness of 110 nm and exhibited a refractive index of 1.845.

Conditions for drying the low refractive layer were 30 seconds at 90 degrees centigrade. In addition, conditions for curing the low refractive layer under UV radiation were that UV radiation was irradiated at a luminous intensity of 600 mW/cm$^2$ and a radiation dose of 600 mJ/cm$^2$ by use of the air-cooled metal halide lamp (manufactured by Eye Graphics Co., Ltd.) having a luminous intensity of 240 W/cm while nitrogen was being purged in such a way that an ambient atmosphere came to include an oxygen concentration of 0.1 volume % or less. The middle refractive layer had a film thickness of 86 nm and exhibited a refractive index of 1.42.

The optical film 111 having the hardcoating layer and the antireflection layer laid on the optically anisotropic layer was thus produced. As to the optical film 111, an in-plane retardation Re value and a retardation Rth value achieved in a thickness direction of the film by measuring an Re value at different angle of inclination were determined at a wavelength of 550 nm by use of the automatic birefringent meter KOBRA-21ADH (manufactured by Oji Scientific Instrument). Re was 150 nm, and Rth was −1 nm.

Example 6

(Production of an Optical Film 112)

The coating fluid for a hardcoating layer having the above composition was applied over ZRD60S (having a thickness of 60 μm) manufactured by Fujifilm, by use of the gravure coater. After having been dried at 100 degrees centigrade, the coating layer was exposed to UV radiation at a luminous intensity of 400 mW/cm$^2$ and a radiation dose of 150 mJ/cm$^2$ so as to become cured, by use of an air-cooled metal halide lamp (manufactured by Eye Graphics Co., Ltd.) having a luminous intensity of 160 W/cm while nitrogen was being purged in such a way that an ambient atmosphere came to include an oxygen concentration of 1.0 volume % or less, whereby a hardcoating layer A having a thickness of 12 μm was formed.

Further, the coating fluid for a middle refractive layer, the coating fluid for a highly refractive layer, and the coating fluid for a low refractive layer were applied by use of the gravure coater, whereby the middle refractive layer, the highly refractive layer, and the low refractive layer were formed. Thus, an antireflection film was produced.

Conditions for drying the middle refractive layer were 30 seconds at 90 degrees centigrade. In addition, conditions for curing the middle refractive layer under UV radiation were that UV radiation is irradiated at a luminous intensity of 300 mW/cm$^2$ and a radiation dose of 240 mJ/cm$^2$ by use of the air-cooled metal halide lamp (manufactured by Eye Graphics Co., Ltd.) having a luminous intensity of 180 W/cm while nitrogen was being purged in such a way that an ambient atmosphere came to include an oxygen concentration of 1.0 volume % or less. The middle refractive layer had a film thickness of 65.5 nm and exhibited a refractive index of 1.638.

Conditions for drying the highly refractive layer were 30 seconds at 90 degrees centigrade. In addition, conditions for curing the highly refractive layer under UV radiation were that UV radiation was irradiated at a luminous intensity of 300 mW/cm$^2$ and a radiation dose of 240 mJ/cm$^2$ by use of the air-cooled metal halide lamp (manufactured by Eye Graphics Co., Ltd.) having a luminous intensity of 240 W/cm while nitrogen was being purged in such a way that an ambient atmosphere came to include an oxygen concentration of 1.0 volume % or less. The highly refractive layer had a film thickness of 110 nm and exhibited a refractive index of 1.845.

Conditions for drying the low refractive layer were 30 seconds at 90 degrees centigrade. In addition, conditions for curing the low refractive layer under UV radiation were that UV radiation was irradiated at a luminous intensity of 600 mW/cm$^2$ and a radiation dose of 600 mJ/cm$^2$ by use of the air-cooled metal halide lamp (manufactured by Eye Graphics Co., Ltd.) having a luminous intensity of 240 W/cm while nitrogen was being purged in such a way that an ambient atmosphere came to include an oxygen concentration of 0.1 volume % or less. The low refractive layer had a film thickness of 86 nm and exhibited a refractive index of 1.42.

By use of a polyvinyl-alcohol-based adhesive, the thus-produced antireflection film was affixed to the optical film 101 in such a way that a support (ZRD60S) of the antireflection film came to an optically anisotropic layer side of the optical film 101 produced in connection with Example 1.

The optical film 112 was thus produced. As to the optical film 112, an in-plane retardation Re value and a retardation Rth value achieved in a thickness direction of the film by measuring an Re value at different angle of inclination were determined at a wavelength of 550 nm by use of the automatic birefringent meter KOBRA-21ADH (manufactured by Oji Scientific Instrument). Re was 150 nm, and Rth was −1 nm.

Example 7

(Production of a Cellulose Acylate Film 003)

Like the cellulose acylate film 001 produced in connection with Example 1, the cellulose acylate film 003 of the present invention that exhibited Re of −3 nm and Rth of −112 nm at a wavelength of 550 nm was produced so as to become 1.5 times thicker.

(Production of an Optical Film 113)

By means of a technique identical with that employed in forming the optically anisotropic layer 011 in connection with Example 1, an optically anisotropic layer was produced by use of the above-produced cellulose acylate film 003 in lieu of the cellulose acylate film 001 employed in Example 1. Optical performance of the optically anisotropic layer was ascertained to be equal to that of the optically anisotropic layer 011 described in connection with Example 1.

The coating fluid for a hardcoating layer having the above composition was applied over FUJITAC TD80UL (having a thickness of 80 μm) manufactured by Fujifilm, by use of the gravure coater. After having been dried at 100 degrees centigrade, the coating layer was exposed to UV radiation at a luminous intensity of 400 mW/cm² and a radiation dose of 150 mJ/cm² so as to become cured, by use of an air-cooled metal halide lamp (manufactured by Eye Graphics Co., Ltd.) having a luminous intensity of 160 W/cm while nitrogen was being purged in such a way that an ambient atmosphere came to include an oxygen concentration of 1.0 volume % or less, whereby a hardcoating layer A having a thickness of 12 μl was formed.

Further, the coating fluid for a middle refractive layer, the coating fluid for a highly refractive layer, and the coating fluid for a low refractive layer were applied by use of the gravure coater, whereby the middle refractive layer, the highly refractive layer, and the low refractive layer were formed. Thus, an antireflection film was produced.

Conditions for drying the middle refractive layer were 30 seconds at 90 degrees centigrade. In addition, conditions for curing the middle refractive layer under UV radiation were that UV radiation was irradiated at a luminous intensity of 300 mW/cm² and a radiation dose of 240 mJ/cm² by use of the air-cooled metal halide lamp (manufactured by Eye Graphics Co., Ltd.) having a luminous intensity of 180 W/cm while nitrogen was being purged in such a way that an ambient atmosphere came to include an oxygen concentration of 1.0 volume % or less. The middle refractive layer had a film thickness of 65.5 nm and exhibited a refractive index of 1.638.

Conditions for drying the highly refractive layer were 30 seconds at 90 degrees centigrade. In addition, conditions for curing the highly refractive layer under UV radiation were that UV radiation was irradiated at a luminous intensity of 300 mW/cm² and a radiation dose of 240 mJ/cm² by use of the air-cooled metal halide lamp (manufactured by Eye Graphics Co., Ltd.) having a luminous intensity of 240 W/cm while nitrogen was being purged in such a way that an ambient atmosphere came to include an oxygen concentration of 1.0 volume % or less. The highly refractive layer had a film thickness of 110 nm and exhibited a refractive index of 1.845.

Conditions for drying the low refractive layer were 30 seconds at 90 degrees centigrade. In addition, conditions for curing the low refractive layer under UV radiation were that UV radiation was irradiated at a luminous intensity of 600 mW/cm² and a radiation dose of 600 mJ/cm² by use of the air-cooled metal halide lamp (manufactured by Eye Graphics Co., Ltd.) having a luminous intensity of 240 W/cm while nitrogen was being purged in such a way that an ambient atmosphere came to include an oxygen concentration of 0.1 volume % or less. The low refractive layer had a film thickness of 86 nm and exhibited a refractive index of 1.42.

By use of the polyvinyl-alcohol-based adhesive, the thus-produced antireflection film was affixed to the optical film in such a way that a support (TD80UL) of the antireflection film came to an optically anisotropic layer side. The optical film 113 was thus produced. As to the optical film 113, an in-plane retardation Re value and a retardation Rth value achieved in a thickness direction of the film by measuring an Re value at different angle of inclination were determined at a wavelength of 550 nm by use of the automatic birefringent meter KOBRA-21ADH (manufactured by Oji Scientific Instrument). Re was 150 nm, and Rth was 3 nm.

Example 8

(Production of a Cellulose Acylate Film 004)

Except that 1.2 mass % of a UV absorbent A described below was added to the cellulose acylate solution during production of the cellulose acylate film 001 of Example 1 and that 4 mass % of the Rth-decreasing B were also added to the solution, the cellulose acylate film 004 was produced in the same manner as was the cellulose acylate film 001 of Example 1. The thus-produced cellulose acylate film 004 exhibited Re of −2 nm and Rth of −75 nm.

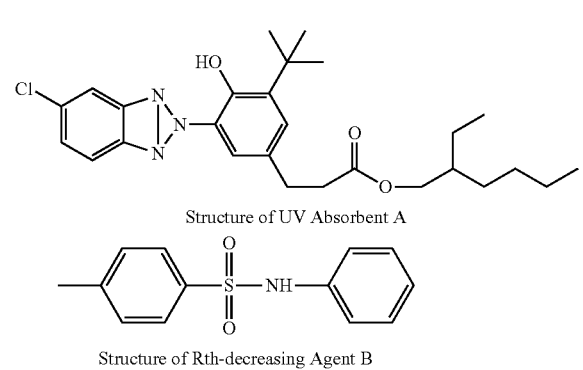

Structure of UV Absorbent A

Structure of Rth-decreasing Agent B (Production of an Optical Film 114)

By means of a technique identical with that employed in producing the optically anisotropic layer 011 in connection with Example 1, an optically anisotropic layer was formed by use of the above-produced cellulose acylate film 004 in lieu of the cellulose acylate film 001 employed in Example 1, whereupon the optical film 114 was produced. Optical performance of the optically anisotropic layer was ascertained to be equal to that of the optically anisotropic layer 011 described in connection with Example 1. Re and Rth values of the optical film 114 were determined by means of the same technique as that employed in Example 1. Table 8 shows results.

TABLE 8

(Optical Performance of Optical Film 114)

| Optical Film 114 | |
|---|---|
| Re (value measured at 550 nm)/nm | 148 |
| Rth (value measured at 550 nm)/nm | −1 |

Comparative Example 6

(Production of a Cellulose Acylate Film 005)

By means of a technique identical with that employed in producing the cellulose acylate film 001 in connection with Example 1, the cellulose acylate film 005 was produced except that, during production of the cellulose acylate film 001 of Example 1, there were performed changing the cellulose acting as a raw material to cellulose including an acetyl substitution degree of 2.86, adding 1.2 mass % of the UV absorbent A to the cellulose acylate solution, and additionally adding 11 mass % of a plasticizer provided below. The thus-produced cellulose acylate film 005 exhibited Re of 2 nm and Rth of 48 nm at a wavelength of 550 nm

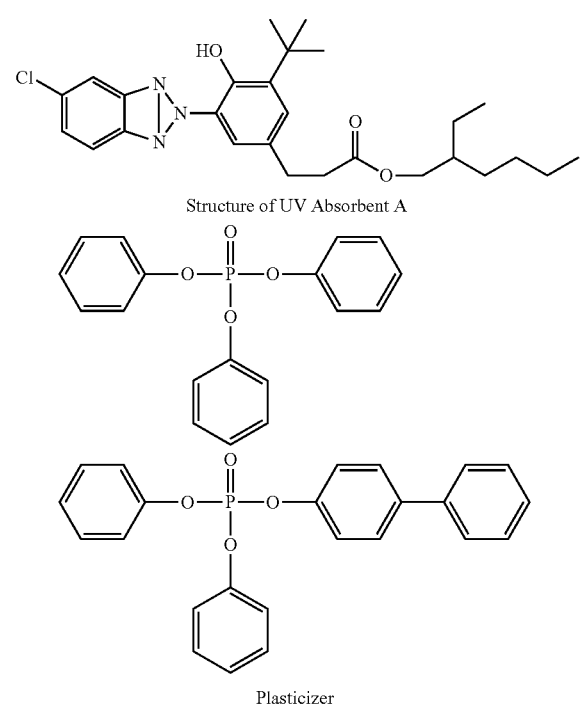

Structure of UV Absorbent A

Plasticizer (Production of an Optical Film 115)

By means of a technique identical with that employed in producing the optically anisotropic layer 011 in connection with Example 1, the optically anisotropic layer was produced by use of the above-produced cellulose acylate film 005 in lieu of the cellulose acylate film 001 employed in Example 1. Optical performance of the optically anisotropic layer was ascertained to be equal to that of the optically anisotropic layer 011 described in connection with Example 1. Re and Rth values of the optical film 115 were determined by means of the same technique as that employed in Example 1. Table 9 shows results.

TABLE 9

(Optical Performance of Optical Film 115)

| Optical Film 115 | |
|---|---|
| Re (value measured at 550 nm)/nm | 152 |
| Rth (value measured at 550 nm)/nm | 122 |

Comparative Example 7

(Production of a Cellulose Acylate Film 006)

During production of the cellulose acylate film 001 of Example 1, cellulose acting as a raw material was changed to cellulose including an acetyl substitution degree of 2.94, and the dope was heated at 80 degrees centigrade for 30 minutes, to thus be fused. The cellulose acylate film 006 was produced in the same manner as was the cellulose acylate film 001 in Example 1 except that 1.2 mass % of the UV absorbent A was added to the cellulose acylate solution and 11 mass % of the Rth-decreasing agent B was put in the solution. The thus-produced cellulose acylate film 006 exhibited Re of −1 nm and Rth of −1 nm at a wavelength of 550 nm.

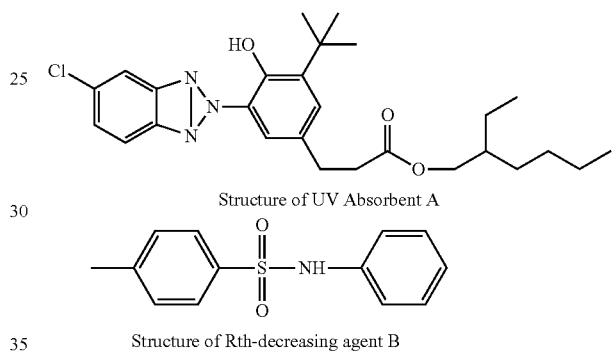

Structure of UV Absorbent A

Structure of Rth-decreasing agent B (Production of an Optical Film 116)

By means of a technique identical with that employed in producing the optically anisotropic layer 011 in connection with Example 1, an optically anisotropic layer was produced by use of the above-produced cellulose acylate 006 in lieu of the cellulose acylate film 001 employed in Example 1, whereby the optical film 116 was formed. Optical performance of the optically anisotropic layer was ascertained to be equal to that of the optically anisotropic layer 011 described in connection with Example 1. Re and Rth values of the optical film 116 were determined by means of the same technique as that employed in Example 1. Table 10 shows results.

TABLE 10

(Optical Performance of Optical Film 116)

| Optical Film 116 | |
|---|---|
| Re (value measured at 550 nm)/nm | 149 |
| Rth (value measured at 550 nm)/nm | 73 |

Comparative Example 8

(Production of a Cellulose Acylate Film 007)

Like the cellulose acylate film 004 manufactured in Example 8, the cellulose acylate film 007 of the present invention that exhibited Re=−3 nm and Rth=−149 nm at a wavelength of 550 nm was produced to a double thickness.
(Production of an Optical Film 117)

By means of a technique identical with that employed in producing the optically anisotropic layer 011 in connection with Example 1, an optically anisotropic layer was produced by use of the above-produced cellulose acylate film 007 in lieu of the cellulose acylate film 001 employed in Example 1, whereby the optical film 117 was produced. Optical performance of the optically anisotropic layer was ascertained to be equal to that of the optically anisotropic layer 011 described in connection with Example 1. Re and Rth values of the optical film 117 were determined by means of the same technique as that employed in Example 1. Table 11 shows results.

TABLE 11

(Optical Performance of Optical Film 117)

Optical Film 117

| | |
|---|---|
| Re (value measured at 550 nm)/nm | 147 |
| Rth (value measured at 550 nm)/nm | −75 |

Example 9

(Production of a Cellulose Acetate Film 008)

The following compositions were charged into a mixing tank and agitated while being heated, to thus dissolve the respective components. A cellulose acetate solution was thus prepared.
(Composition of the Cellulose Acetate Solution)

| | |
|---|---|
| Cellulose acetate having an acetification degree of 60.7 to 61.1% | 100 parts by mass |
| Triphenyl phosphate (a plasticizer) | 7.8 parts by mass |
| Biphenyl diphenyl phosphate (a plasticizer) | 3.9 parts by mass |
| Methylene chloride (a first solvent) | 336 parts by mass |
| Methanol (a second solvent) | 29 parts by mass |
| 1-butanol (a third solvent) | 11 parts by mass |

16 parts by mass of the retardation enhancing agent (A) described below, 92 parts by mass of methylene chloride, and 8 parts by mass of methanol were charged into another mixing tank and agitated while being heated, whereby a retardation enhancing agent solution was prepared. 25 parts by mass of the retardation enhancing agent solution were mixed to 474 parts by mass of cellulose acetate solution and sufficiently agitated, to thus prepare a dope. An amount of the retardation enhancing agent added was 6.0 parts by mass with respect to 100 parts by mass of cellulose acetate.

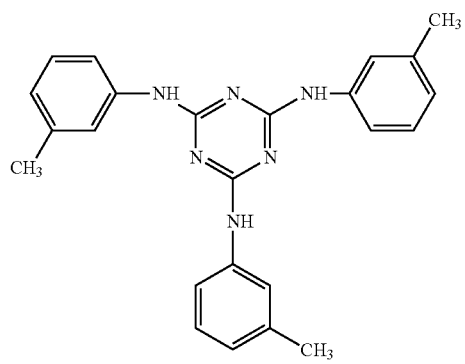

Retardation Enhancing Agent (A)

The thus-produced dope was flow-cast by use of a band stretching machine. After a temperature of a film on a band had come to 40 degrees centigrade, the film was dried for one minute by means of hot air having a temperature of 70 degrees centigrade. The film on the band was further dried for 10 minutes by means of dry air having a temperature of 140 degrees centigrade. Thus, a cellulose acetate film T1 including 0.3 mass % of residual solvent was produced.

The resultantly obtained elongated cellulose acetate film T1 assumed a width of 1490 mm and a thickness of 80 μm. In-plane retardation (Re) of 8 nm and thicknesswise retardation (Rth) of 78 nm were acquired at a wavelength of 550 nm (Alkaline Saponification Treatment)

The cellulose acylate film T1 was caused to pass through a dielectric heating roll at a temperature of 60 degrees centigrade, thereby increasing the temperature of the film to a temperature of 40 degrees centigrade. Subsequently, an alkaline solution having a composition provided below was applied over one side of the film by means of the bar coater at a coating rate of 14 ml/m². The film was then conveyed for ten seconds through an area located below a steam far infrared heater that is manufactured by Noritake Company Ltd. and was heated to a temperature of 110 degrees centigrade. Subsequently, pure water was applied to the film at a coating rate of 3 ml/m² by use of the same bar coater. Next, the film was repeatedly subjected, three times, to water rinsing performed by a fountain coater and hydroextraction performed by an air knife. The film was conveyed to a drying zone at a temperature of 70 degrees centigrade for 10 seconds, to thus be dried. Thus, a cellulose acylate film subjected to alkaline saponification was produced.
(Composition of an Alkaline Solution)
Composition of an Alkaline Solution (Parts by Mass)

| | |
|---|---|
| Potassium hydrate | 4.7 parts by mass |
| Water | 15.8 parts by mass |
| Isopropanol | 63.7 parts by mass |
| Surfactant | 1.0 part by mass |
| SF-1: $C_{14}H_{29}O(CH_2CH_2O)_{20}H$ | |
| Propylene glycol | 14.8 parts by mass |

(Formation of an Oriented Film)

An oriented film coating fluid having the following composition was continually applied over the elongated cellulose acetate film, which had been saponificated as mentioned above, by means of a #14 wire bar. The film was dried for 60 seconds by hot air having a temperature of 60 degrees centigrade and for 120 seconds by hot air having a temperature of 100 degrees centigrade.
Composition of an Oriented Film Coating Fluid

| | |
|---|---|
| Modified polyvinyl alcohol used in Example 1 | 10 parts by mass |
| Water | 371 parts by mass |
| Methanol | 119 parts by mass |
| Glutaraldehyde | 0.5 parts by mass |
| Photopolymerization initiator | 0.3 parts by mass |
| (Irgacure 2959 manufactured by Ciba Japan Ltd.) | |

(Formation of an Optically Anisotropic Layer Including Discotic Liquid Crystal Compound)

The above-produced oriented film was continually subjected to rubbing. At this time, a longitudinal direction of the elongated film and the direction of conveyance were parallel to each other. A rotary shaft of a rubbing roller was oriented in a clockwise direction of 45 degrees with respect to the longitudinal direction of the film.

The coating fluid including a discotic liquid crystal compound having the following composition was continually applied over the oriented film by means of a #2.7 wire bar. A film conveyance speed (V) was set to 36 m/min. In order to dry a solvent of the coating fluid and age the orientation of the discotic liquid crystal compound, the film was heated for 30 seconds by hot air having a temperature of 100 degrees centigrade and further heated for 90 seconds by hot air having a temperature of 120 degrees centigrade. Subsequently, the orientation of the liquid crystal compound was fixed by exposure of the film to UV radiation at a temperature of 80 degrees centigrade, thereby forming an optically anisotropic layer 017 (having a film thickness of 1.6 μm and exhibiting Re of 137 nm and Rth of −58 nm at a wavelength of 550 nm). Thus, an optical film 118 was produced. Re and Rth values of the optical film 118 were determined by means of the same technique as that described in connection with Example 1. Table 12 shows results.

Composition of an Optically Anisotropic Layer Coating Fluid (C)

| | |
|---|---|
| Discotic liquid crystal compound described below | 91 parts by mass |
| Ethylene oxide modified trimethylolpropane triacrylate (V#360, manufactured by Osaka Organic Chemical Industry Ltd.) | 9 parts by mass |
| Photopolymerization initiator (Irgacure 907, manufactured by Ciba-Geigy Ltd.) | 3 parts by mass |
| Sensitizer (Kayacure DETX, manufactured by Nippon Kayaku Co., Ltd.) | 1 parts by mass |
| Pyridinium salt described below | 0.5 parts by mass |
| Fluorine-based polymer (FP2) described below | 0.4 parts by mass |
| Methyl ethyl ketone | 195 parts by mass |

Discotic Liquid Crystal Compound

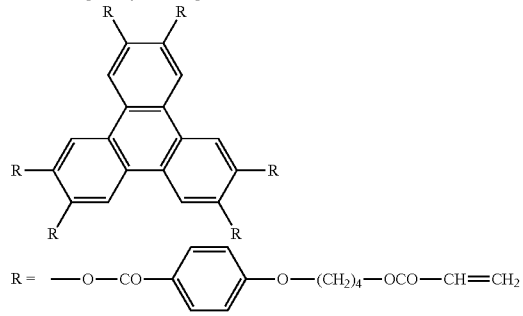

Pyridinium salt

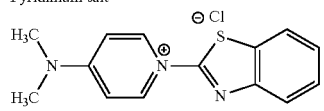

Fluorine-based polymer (FP2)

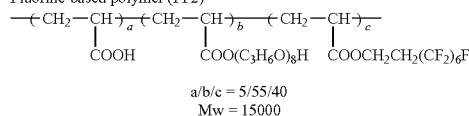

a/b/c = 5/55/40
Mw = 15000

TABLE 12

(Optical Performance of Optical Film 118)

| Optical Film 118 | |
|---|---|
| Re (value measured at 550 nm)/nm | 145 |
| Rth (value measured at 550 nm)/nm | 20 |

Example 10

(Production of an Acrylic Resin)

By reference to JP-A-2008-146003, there was produced a pellet of methyl methacrylate/methyl acrylate copolymer (P-1) by use of 0.0294 parts by mass of 1,1-di-t-butyl-peroxy-3,3,5-trimethyl cyclohexane and 0.115 parts by mass of n-octyl mercaptan along with a monomer mixture including 89.2 parts by mass of methyl methacrylate, 5.8 parts by mass of methyl acrylate, and 5 parts by mass of xylene. In addition, there was produced a pellet of styrene/methacrylate copolymer (P-2) by use of as a photopolymerization initiator, 1,1-tert-butyl per oxy-3,3,5-trimethyl cyclohexane while taking, as a fluid preparation, 75.2 mass % of styrene, 4.8 mass % of methacrylate, and 20 mass % of ethyl benzene.

(Production of an Acrylic Film 009)

By reference to a twenty-first embodiment described in connection with JP-A-2008-146003, an acrylic film 009 having a thickness of 40 μM was produced by use of a resin composition prepared from 60 parts by mass of P-1, 40 parts by mass of P-2, and one part by mass of ADK Stab LA-31 (a UV absorbent manufactured by Adeka Corporation). Re and Rth of the thus-produced acrylic film 009 were measured at a wavelength of 550 nm by use of the automatic birefringent meter KOBRA-21ADH (manufactured by Oji Scientific Instrument). Table 13 shows results.

TABLE 13

(Optical Performance of Acrylic Film 009)

| Acrylic Film 009 | |
|---|---|
| Re (value measured at 550 nm)/nm | 6 |
| Rth (value measured at 550 nm)/nm | −78 |

(Production of an Optical Film 119)

In relation to production of the optically anisotropic layer 011 described in connection with Example 1, the oriented film and the optically anisotropic layer 011 were formed on glass rather than on the cellulose acylate film 001. The thus-produced optically anisotropic layer 011 was peeled off and affixed onto the above-produced acrylic film 009 by use of an adhesive, to thus produce an optical film 119. At this time, a slow axis of the acrylic film 009 and the slow axis of the optically anisotropic layer were arranged so as to cross each other at an angle of 45 degrees. Optical performance (Re and Rth) of the optically anisotropic layer was measured at a wavelength of 550 nm by use of the automatic birefringent meter KOBRA-21ADH (manufactured by Oji Scientific Instrument), whereby Re of 134 nm and Rth of 75 nm were determined.

Re and Rth of the optical film 119 were determined by means of the same technique as that described in connection with Example 1. Table 14 shows results.

TABLE 14

(Optical Performance of Optical Film 119)

| Optical Film 119 | |
|---|---|
| Re (value measured at 550 nm)/nm | 140 |
| Rth (value measured at 550 nm)/nm | −3 |

Comparative Example 9

<<Production of a Cellulose Film 010>>

The FUJITAC TD80UL manufactured by Fujifilm (having a thickness of 80 μm) was extended at 180 degrees centigrade by 20%, whereby the film 010 having a film thickness of 68 μm was produced. Re and Rth of the thus-produced film 010 were measured at a wavelength of 550 nm by use of the automatic birefringent meter KOBRA-21ADH (manufactured by Oji Scientific Instrument). Table 15 shows results.

TABLE 15

| (Optical Performance of Cellulose Film 110) | |
|---|---|
| Optical Film 110 | |
| Re (value measured at 550 nm)/nm | 11 |
| Rth (value measured at 550 nm)/nm | 50 |

<<Production of an Optical Film 120>>

An optically anisotropic layer 018 was formed on the thus-produced cellulose film 010 in the same manner as was the optically anisotropic layer 017 in Example 9, and an optical film 120 was produced. Optical performance of the optically anisotropic layer 018 was ascertained to be equal to that of the optically anisotropic layer 017 described in connection with Example 9.

Re and Rth of the optical film 120 were determined in the same manner as that described in connection with Example 1. Table 16 shows results.

TABLE 16

| (Optical Performance of Optical Film 120) | |
|---|---|
| Optical Film 120 | |
| Re (value measured at 550 nm)/nm | 138 |
| Rth (value measured at 550 nm)/nm | −5 |

Example 11

An optically anisotropic layer was formed on the FUJITAC TD80UL manufactured by Fujifilm (having a thickness of 80 μm) in the same manner as was the optically anisotropic layer 017 in Example 9, and an optical film 121 was produced. Optical performance of the optically anisotropic layer was ascertained to be equal to that of the optically anisotropic layer 017 described in connection with Example 9.

Re and Rth of the optical film 121 were determined in the same manner as that described in connection with Example 1. Table 17 shows results.

TABLE 17

| (Optical Performance of Optical Film 121) | |
|---|---|
| Optical Film 121 | |
| Re (value measured at 550 nm)/nm | 141 |
| Rth (value measured at 550 nm)/nm | −12 |

Example 12

An optically anisotropic layer was formed, in the same manner as was the optically anisotropic layer 017 in Example 9, on the cellulose acylate film 001 produced in Example 1, whereby a composite support A was produced. Optical performance of the optically anisotropic layer was ascertained to be equal to that of the optically anisotropic layer 017 described in connection with Example 9. The composite support A exhibited Re of 138 nm and Rth of 135 nm at a wavelength of 550 nm. Like the Comparative Example 4, a patterning retardation layer was formed over the glass substrate, and the patterning retardation layer was transferred onto the optically anisotropic layer, whereby a patterning retardation film (an optical film 122) was produced. At this time, axial directions of the film were brought in parallel to each other. Rth of the entire optical film 122 exhibited at a wavelength of 550 nm was 2 nm.

Example 13

A patterning retardation layer was formed on the glass substrate in the same manner as in the Comparative Example 5. The thus-formed patterning retardation layer was transferred onto the cellulose acylate film 001 described in connection with Example 1, whereby a patterning retardation film (an optical film 123) was produced. Rth of the entire optical film 123 achieved at a wavelength of 550 nm was 5 nm.

<Production of a Polarizing Plate>

20 ml/m² of an adhesive coating fluid and 20 ml/m² of an upper layer coating fluid B described below were applied to a transparent support side (the optically anisotropic layer 011 of the films 110 to 113 of Examples 4 to 7) of the film produced in each of Examples 1 to 13 and Comparative Examples 1 to 9. The transparent support was dried at 100 degrees centigrade for five minutes, whereby an adhesive-equipped film sample was produced.

(Adhesive Coating Fluid)

| | |
|---|---|
| Water soluble polymer (m) described below | 0.5 g |
| Acetone | 40 ml |
| Ethyl acetate | 55 ml |
| Isopropanol | 5 ml |

(Upper Layer Coating Fluid B)

| | |
|---|---|
| Polyvinyl alcohol (Gohsenol (Registered Trademark) NH-26 manufactured by Nippon Synthetic Chemical Co., Ltd.) | 0.3 g |
| Saponin (a surfactant produced by Merck Japan) | 0.03 g |
| Purified water | 57 ml |
| Methanol | 40 ml |
| Methyl propylene glycol | 3 ml |

Water soluble polymer (m)

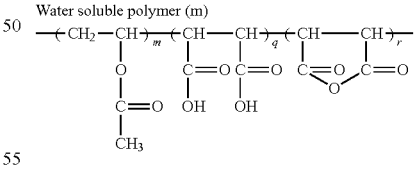

(m = 50, q = 25, r = 25)

Subsequently, a rolled polyvinyl alcohol film having a thickness of 80 μm was continually stretched five times in an aqueous iodine solution, and the thus-stretched film was dried, to thus produce a polarizing film having a thickness of 30 μm. The polarizing film was affixed to a side of the adhesive-equipped film that was covered with an adhesive. A commercially available cellulose acetate film (Fujitac TD80UF manufactured by Fujifilm and that exhibits Re of 3 nm (at 550 nm) and |Rth(630)| of 50 nm) was subjected to alkaline saponification. Subsequently, an adhesive layer was applied over the cellulose acetate film and affixed to the other side of the polarizing film. Thus, polarizing plates 1 through 22 were produced.

(Evaluation of the Polarizing Plates Mounted on a Liquid Crystal Display Device)

<Evaluation 1>

A front polarizing plate of a three-dimensional TV (LC46LV3 manufactured by SHARP) of a liquid crystal shutter glasses type was peeled off. Each of the polarizing plates described in connection with the first through eleventh examples and each of the polarizing plates described in connection with the Comparative Examples 1 through 3 and the Comparative Examples 6 through 9 were affixed to the TV. Further, the polarizing plate on the TV used for liquid crystal shutter glasses was also peeled off. A λ/4 plate was placed between a left-eye-side polarizing plate and the liquid crystal layer and a right-eye-side polarizing plate and the liquid crystal layer in such a way that the slow axis of liquid crystal and the slow axis of the polarizing plate became perpendicular to each other.

A spectrophotometer (SR-3 manufactured by Topcon Corporation) was placed at a position viewed through the glasses. White brightness achieved when each of the polarizing plates was affixed to the TV was measured from the front and directions at a polar angle of 60 degrees and an azimuth angle of 45 degrees (hereunder called "oblique directions"). During measurement of brightness in the oblique angle, the liquid crystal shutter glasses were directed toward the center of the screen.

The measurement results acquired before and after the polarizing plate was affixed to the TV were compared to each other. In relation to the direction toward the front, all of the polarizing plates except the polarizing plate described in connection with the Comparative Example 7 exhibited enhancement of white brightness by 5% or more. In relation to the oblique directions, the Comparative Examples 1 through 3 and 6 through 8 exhibited a fall in white brightness by 5% or more. The Examples 1 through 11 showed equal results.

A composite image including a white right-eye image and a black left-eye image was displayed in a three-dimensional manner. Brightness was measured through the right-eye glass/the left-eye glass, and measured crosstalk was evaluated (CRO) by the following expression.

(Brightness exhibited at this time was taken as $Y\_RR$ and $Y\_RL, CRO=(YRR-YRL)/(YRR+YRL)$)

The expression shows that a stereoscopic effect can be maintained as crosstalk becomes lower.

Crosstalk acquired in the direction of the front corresponds to crosstalk acquired when a viewer's face was inclined. Further, crosstalk acquired in the oblique directions corresponds to crosstalk acquired when the liquid crystal shutter glasses placed at an angle were directed toward the screen center.

The measurement results acquired before and after the polarizing plate was affixed to the TV were compared to each other. In relation to the direction toward the front, all of the polarizing plates showed no crosstalk. In relation to the oblique directions, the Comparative Examples 1 through 3 and 6 through 8 showed an increase in crosstalk by 10% or more. The first through eleventh examples and the Comparative Example 9 showed a decrease in crosstalk of 10% or more.

<Evaluation 2>

A front polarizing plate HPL02065 (manufactured by HP) was peeled off, and each of the polarizing plates described in connection with the twelfth and thirteenth examples and the Comparative Examples 4 and 5 was affixed.

Likewise, the spectrophotometer (SR-3 manufactured by Topcon Corporation) was placed at a position viewed through the glasses. White brightness and crosstalk acquired when each of the polarizing plates was affixed were measured.

White brightness and crosstalk were measured from the front and directions at a polar angle of 60 degrees and an azimuth angle of 45 degrees (hereunder called "oblique directions"). During measurement of brightness in the oblique angle, the glasses were directed toward the center of the screen.

The measurement results acquired before and after the polarizing plate was affixed to the TV were compared to each other. In relation to the direction toward the front, all of the polarizing plates showed equal white brightness. In relation to the oblique directions, the Comparative Examples 4 and 5 showed equal white brightness, whilst the twelfth and thirteenth examples showed a decrease in crosstalk by 5% or more.

The measurement results acquired before and after the polarizing plate was affixed to the TV were compared to each other. In relation to the direction toward the front, all of the polarizing plates showed equal crosstalk. In relation to the oblique directions, the Comparative Examples 4 and 5 showed equal crosstalk, whilst the twelfth and thirteenth examples showed a decrease in crosstalk by 10% or more.

Industrial Applicability

According to the present invention, it is possible to provide an image display device that can diminish crosstalk that is a trouble of a 3D image caused by a view angle characteristic and entrance of reflected external light.

The present invention has been described in detail and by reference to the specific examples. However, it is manifest to those skilled in the art that various alterations or modifications can be made to the invention without departing the spirit and scope of the present invention.

The present patent application is based on Japanese Patent Application filed on Feb. 18, 2010 (JP2010-034127) and Japanese Patent Application filed on Sep. 15, 2010 (JP2010-207331), the entire contents of which are incorporated herein by reference.

The invention claimed is:

1. A liquid crystal display device comprising:
 a liquid crystal layer; and
 a first polarizing plate and a second polarizing plate that are placed with the liquid crystal layer sandwiched therebetween and that each include a polarizing film and a protective film provided on at least an outer surface of the polarizing film, in which the first polarizing plate is placed on a light source side and the second polarizing plate is placed on a view side,
 wherein
 the protective film on the view side of the second polarizing plate includes a transparent support satisfying the following Expression (1) and an optically anisotropic layer having a λ/4 function, and
 Rth of the protective film on the view side of the second polarizing plate is |Rth|≦20, $$0 \leq |Re(550)| \leq 10 \quad (I)$$

wherein Re(550) denotes an in-plane retardation value (unit: nm) at a wavelength of 550 nm; and Rth denotes a retardation value (unit: nm) in a film thickness direction at a wavelength of 550 nm, and wherein the in-plane retardation value and the retardation value in the film thickness direction are defined by the following expressions with respect to an object:

$$Re=(nx-ny)\times d$$

$$Rth=((nx+ny)/2-nz)\times d$$

wherein nx denotes a refractive index in a direction of a slow axis in a plane of the object; ny denotes a refractive index in a direction orthogonal to nx in the plane; nz denotes a refractive index in a direction orthogonal to nx and ny; and "d" denotes a film thickness of the object in the direction of nz.

2. The liquid crystal display device according to claim 1, wherein in the protective film on the view side of the second polarizing plate, when $Rth_1$ denotes Rth of the transparent support and $Rth_2$ denotes Rth of the optically anisotropic layer, an absolute value of a sum of $Rth_1$ and $Rth_2$, $Rth_1+Rth_2$, is $|Rth_1+Rth_2|\leqq 20$.

3. A liquid crystal display device comprising:
a liquid crystal layer; and
a first polarizing plate and a second polarizing plate that are placed with the liquid crystal layer sandwiched therebetween and that each include a polarizing film and a protective film placed on at least an outer surface of the polarizing film, in which the first polarizing plate is placed on a light source side and the second polarizing plate is placed on a view side, wherein
the protective film on the view side of the second polarizing plate includes a transparent support satisfying the following Expression (1) and an optically anisotropic layer having a λ/4 function,
wherein when $Rth_1$ denotes Rth of the transparent support and $Rth_2$ denotes Rth of the optically anisotropic layer, an absolute value of a sum of $Rth_1$ and $Rth_2$, $Rth_1+Rth_2$, is $|Rth_1+Rth_2|\leqq 20$, $$0\leqq|Re(550)|\leqq 10 \qquad (I)$$

wherein Re(550) denotes an in-plane retardation value (unit: nm) at a wavelength of 550 nm; and Rth denotes a retardation value (unit: nm) in a film thickness direction at a wavelength of 550 nm, and wherein
the in-plane retardation value and the retardation value in the film thickness direction are defined by the following expressions with respect to an object:

$$Re=(nx-ny)\times d$$

$$Rth=((nx+ny)/2-nz)\times d$$

wherein nx denotes a refractive index in a direction of a slow axis in a plane of the object; ny denotes a refractive index in a direction orthogonal to nx in the plane; nz denotes a refractive index in a direction orthogonal to nx and ny; and "d" denotes a film thickness of the object in the direction of nz.

4. The liquid crystal display device according to claim 1, wherein the protective film on the view side of the second polarizing plate further includes one or more antireflection films on an outermost surface thereof.

5. The liquid crystal display device according to claim 4, wherein a UV radiation absorbent is included in any of the transparent support constituting the protective film of the second polarizing plate, the optically anisotropic layer, an antireflection film, and an adhesive bonding them together.

6. The liquid crystal display device according to claim 1, wherein the transparent support constituting the protective film of the second polarizing plate includes a thermoplastic resin as a main component.

7. A method for manufacturing a liquid crystal display device described in claim 1, wherein the protective film of the second polarizing plate is produced by a co-flow-casting method.

8. An image display device comprising a polarizing plate on a view side thereof,
wherein
the polarizing plate includes a polarizing film and a protective film on at least the view side of the polarizing plate,
the protective film on the view side of the polarizing plate includes a transparent support satisfying the following Expression (1) and an optically anisotropic layer having a λ/4 function, and
Rth of the protective film on the view side of the polarizing plate corresponds to $|Rth|\leqq 20$, $$0\leqq|Re(550)|\leqq 10 \qquad (I)$$

wherein Re(550) denotes an in-plane retardation value (unit: nm) at a wavelength of 550 nm; and Rth denotes a retardation value (unit: nm) in a film thickness direction at a wavelength of 550 nm, and wherein
the in-plane retardation value and the retardation value in the film thickness direction are defined by the following expressions with respect to an object:

$$Re=(nx-ny)\times d$$

$$Rth=((nx+ny)/2-nz)\times d$$

wherein nx denotes a refractive index in a direction of a slow axis in a plane of the object; ny denotes a refractive index in a direction orthogonal to nx in the plane; nz denotes a refractive index in a direction orthogonal to nx and ny; and "d" denotes a film thickness of the object in the direction of nz.

* * * * *